(12) United States Patent
Asaki et al.

(10) Patent No.: US 8,386,636 B2
(45) Date of Patent: Feb. 26, 2013

(54) BUSINESS PROCESS SYSTEM MANAGEMENT METHOD

(75) Inventors: Katsutoshi Asaki, Kawasaki (JP); Nobuyuki Yamamoto, Yokohama (JP); Mitsunobu Tasaka, Kawasaki (JP); Jun Yoshida, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 1443 days.

(21) Appl. No.: 11/600,090

(22) Filed: Nov. 16, 2006

(65) Prior Publication Data

US 2007/0118414 A1    May 24, 2007

(30) Foreign Application Priority Data

Nov. 24, 2005    (JP) .................................. 2005-337997

(51) Int. Cl.
G06F 15/173 (2006.01)
G06F 9/46 (2006.01)
(52) U.S. Cl. .......................... 709/238; 709/224; 718/106
(58) Field of Classification Search .................. 709/104, 709/238
See application file for complete search history.

(56) References Cited

U.S. PATENT DOCUMENTS

| 6,292,940 B1 * | 9/2001 | Sato ............................... 717/157 |
| 7,024,671 B2 * | 4/2006 | Yamashita ..................... 718/102 |
| 2003/0120709 A1 * | 6/2003 | Pulsipher et al. ............. 709/106 |
| 2004/0111509 A1 * | 6/2004 | Eilam et al. ................... 709/224 |
| 2005/0102674 A1 | 5/2005 | Tameshige et al. |

FOREIGN PATENT DOCUMENTS

| JP | 2002-351852 | 12/2002 |
| JP | 2005-100387 | 4/2005 |
| JP | 2005-141605 | 6/2005 |

* cited by examiner

*Primary Examiner* — Ashok B. Patel
*Assistant Examiner* — Nicholas Jensen
(74) *Attorney, Agent, or Firm* — Antonelli, Terry, Stout & Kraus, LLP.

(57) ABSTRACT

A prediction method for predicting a computer-resource usage amount with the use of a service call relation to be extracted from a business process definition. A resource allocation method includes, before adding a new business process to the system, steps of calculating the computer-resource predicted usage amount by using a computer-resource usage amount prediction step and of allocating a computer, as a new service execution computer, to a service execution computer whose computer-resource predicted usage amount has exceeded a predetermined value, the computer being different from the service execution computer.

19 Claims, 14 Drawing Sheets

FIG.3

| 335 | 336 | 337 | 338 | 339 | ~312 |
|---|---|---|---|---|---|
| COMPUTER NAME | AGENT ADDRESS | IN-OPERATION SERVICE | AVERAGE CPU USAGE RATIO | PREDICTED CPU USAGE RATIO | |
| HOST A | 192.168.1.1:80 | BUSINESS PROCESS A BUSINESS PROCESS D | 30 | 30 -> 40 | |
| HOST B | 192.168.1.2:80 | BUSINESS PROCESS B BUSINESS PROCESS C | 40 | 40 -> 60 | |
| HOST C | 192.168.1.3:80 | SERVICE A | 60 | 60 -> 80 | |
| HOST D | 192.168.1.4:80 | SERVICE B SERVICE C | 40 | 40 -> 60 | |
| HOST E | 192.168.1.5:80 | SERVICE D | 20 | 20 -> 30 | |
| HOST F | 192.168.1.6:80 | | 0 | 0 | |
| ... | ... | ... | ... | ... | |

FIG.4

| 340 | 341 | 342 |
|---|---|---|
| EVENT | EXECUTION CONDITION | ACTION |
| PREDICTED CPU USAGE RATIO OF COMPUTER | ≧ 70% | ADDITION OF COMPUTER |
| ... | ... | ... |

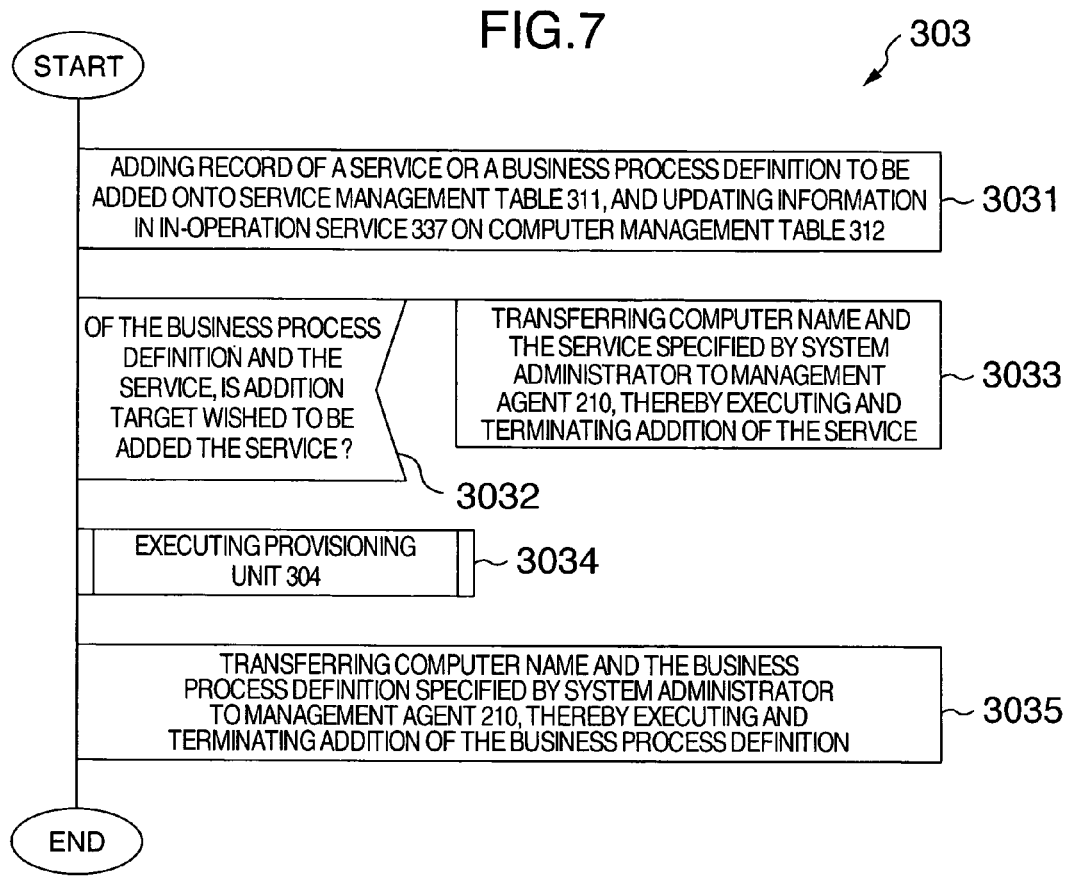
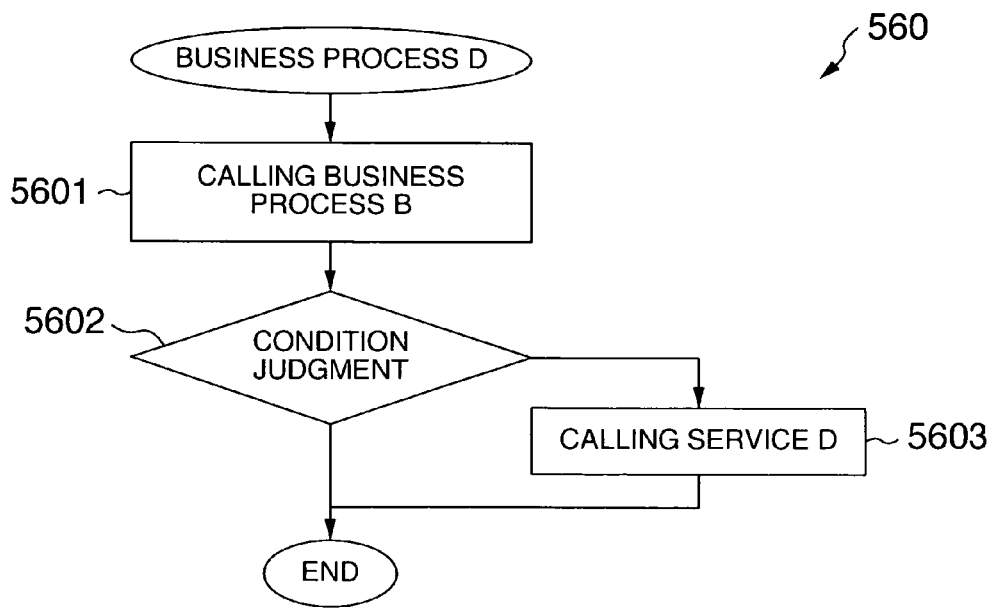

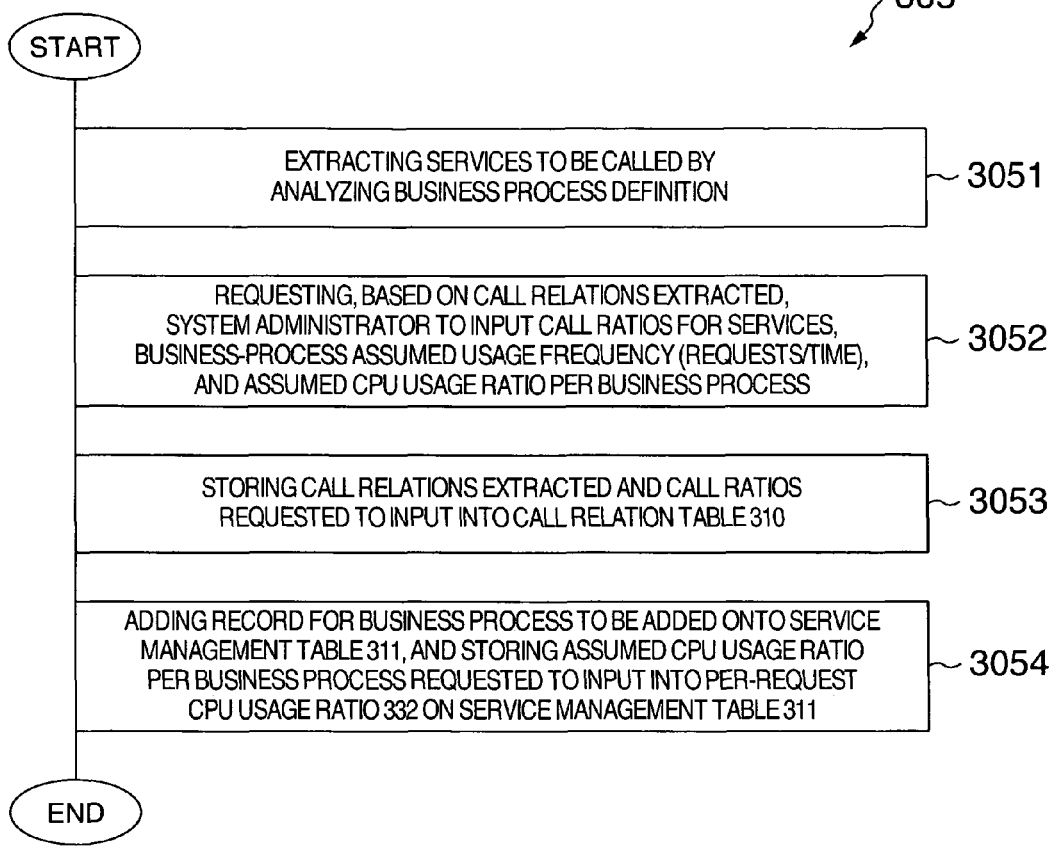
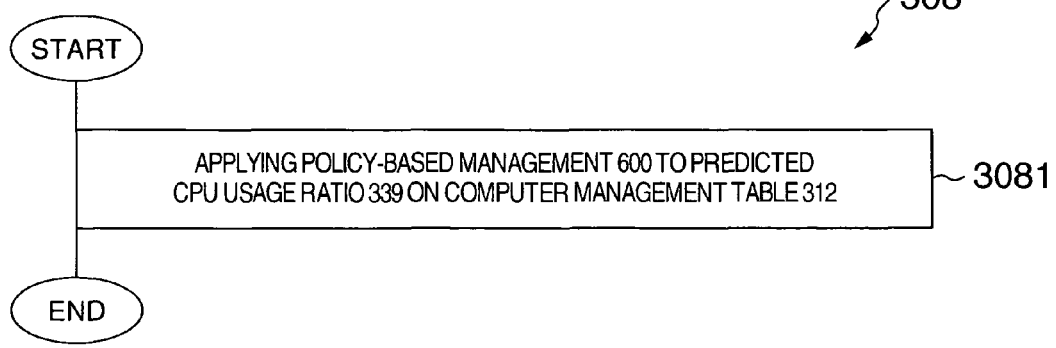

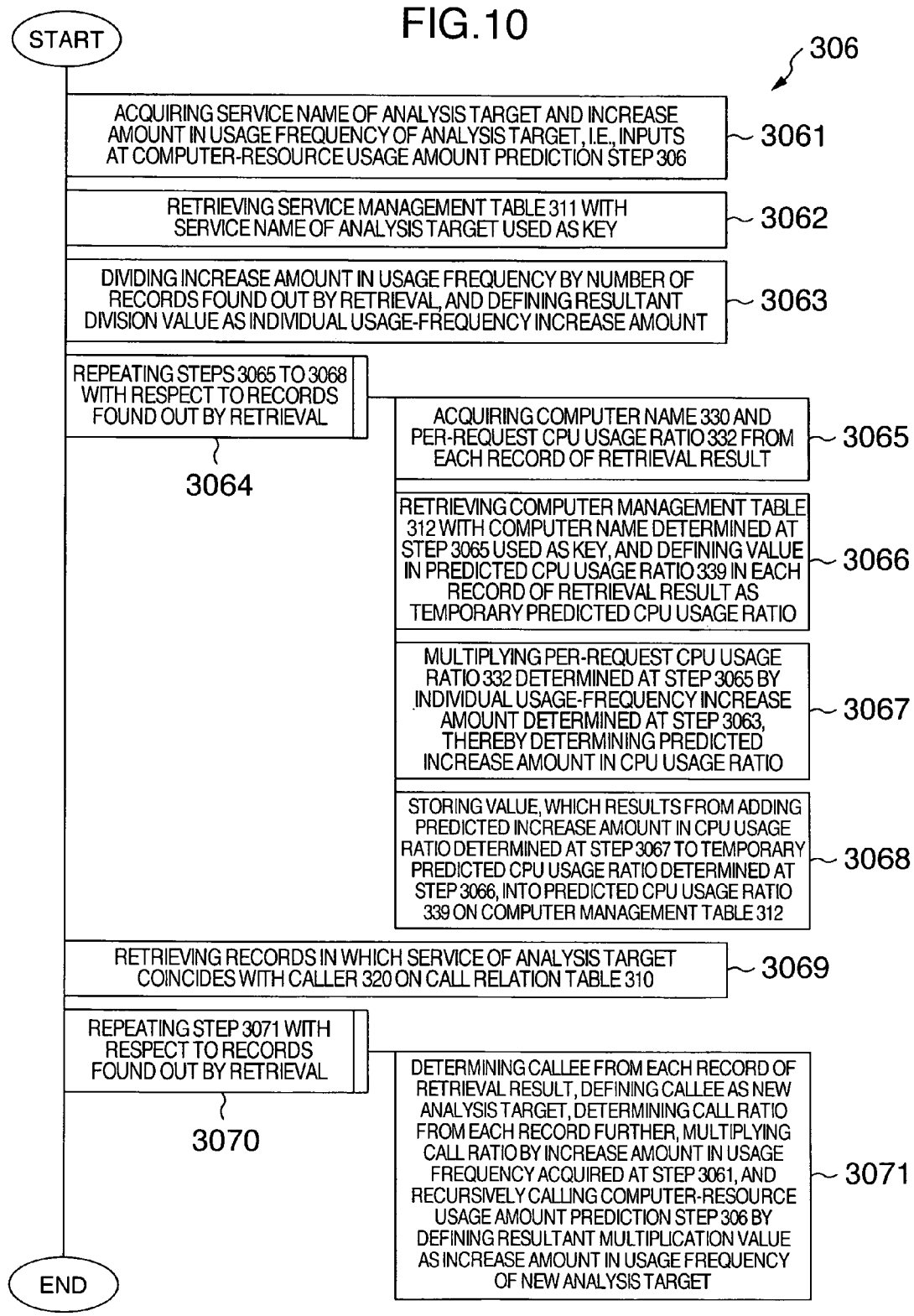

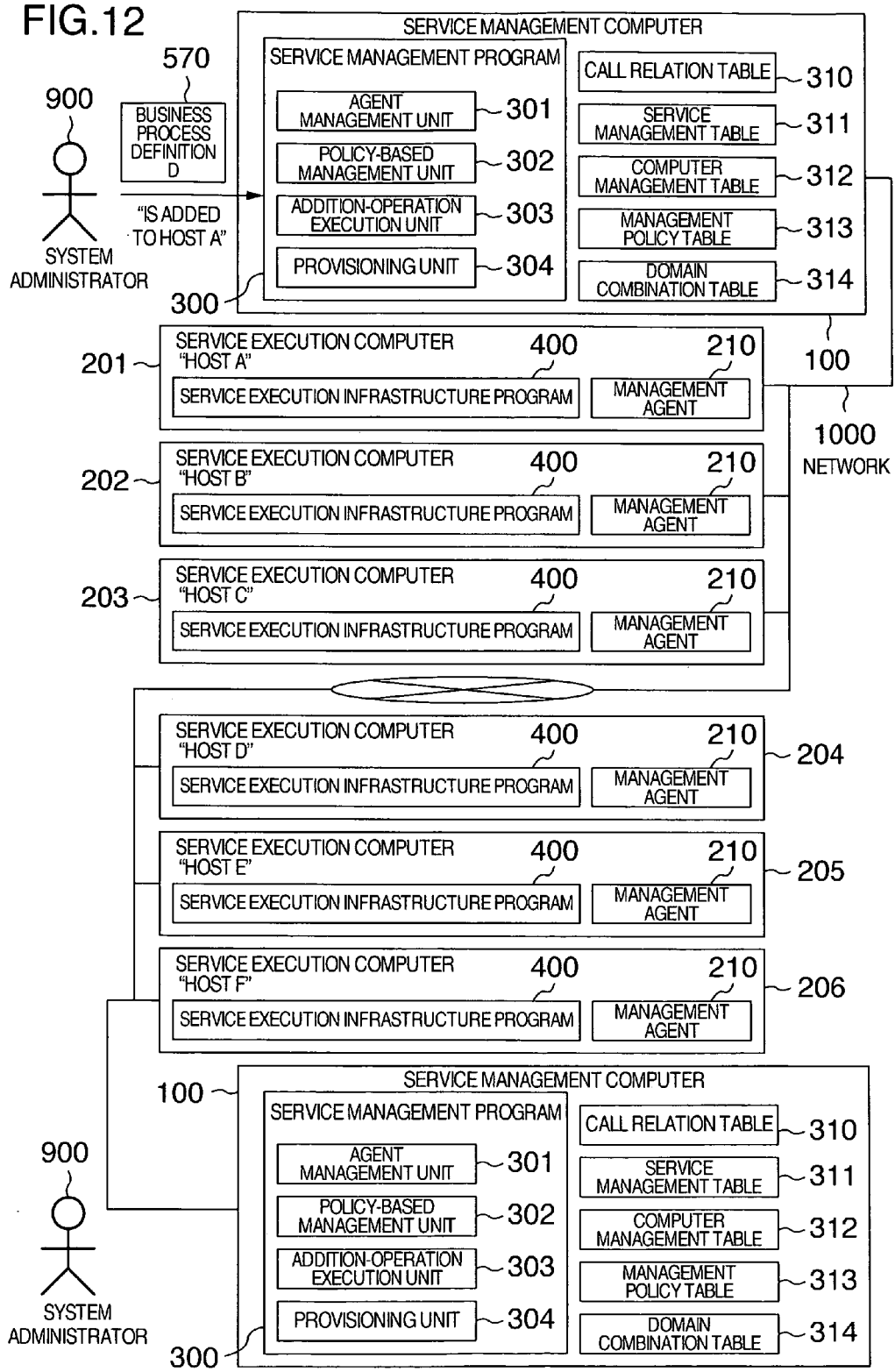

| SERVICE NAME | MANAGEMENT SERVER ADDRESS |
|---|---|
| SERVICE A | 192.168.2.253:8080 |
| SERVICE B | 192.168.2.253:8080 |
| ... | ... |

START

APPLYING POLICY-BASED MANAGEMENT 600 TO PREDICTED CPU USAGE RATIO 339 ON COMPUTER MANAGEMENT TABLE 312 — 3130

TRANSMITTING EXECUTION REQUEST FOR POLICY-BASED MANAGEMENT EXECUTION STEP 308 TO COMBINATION-DESTINATION ADDRESS STORED AT STEP 3096 AT COMPUTER-RESOURCE USAGE AMOUNT PREDICTION STEP 306 — 3131

END

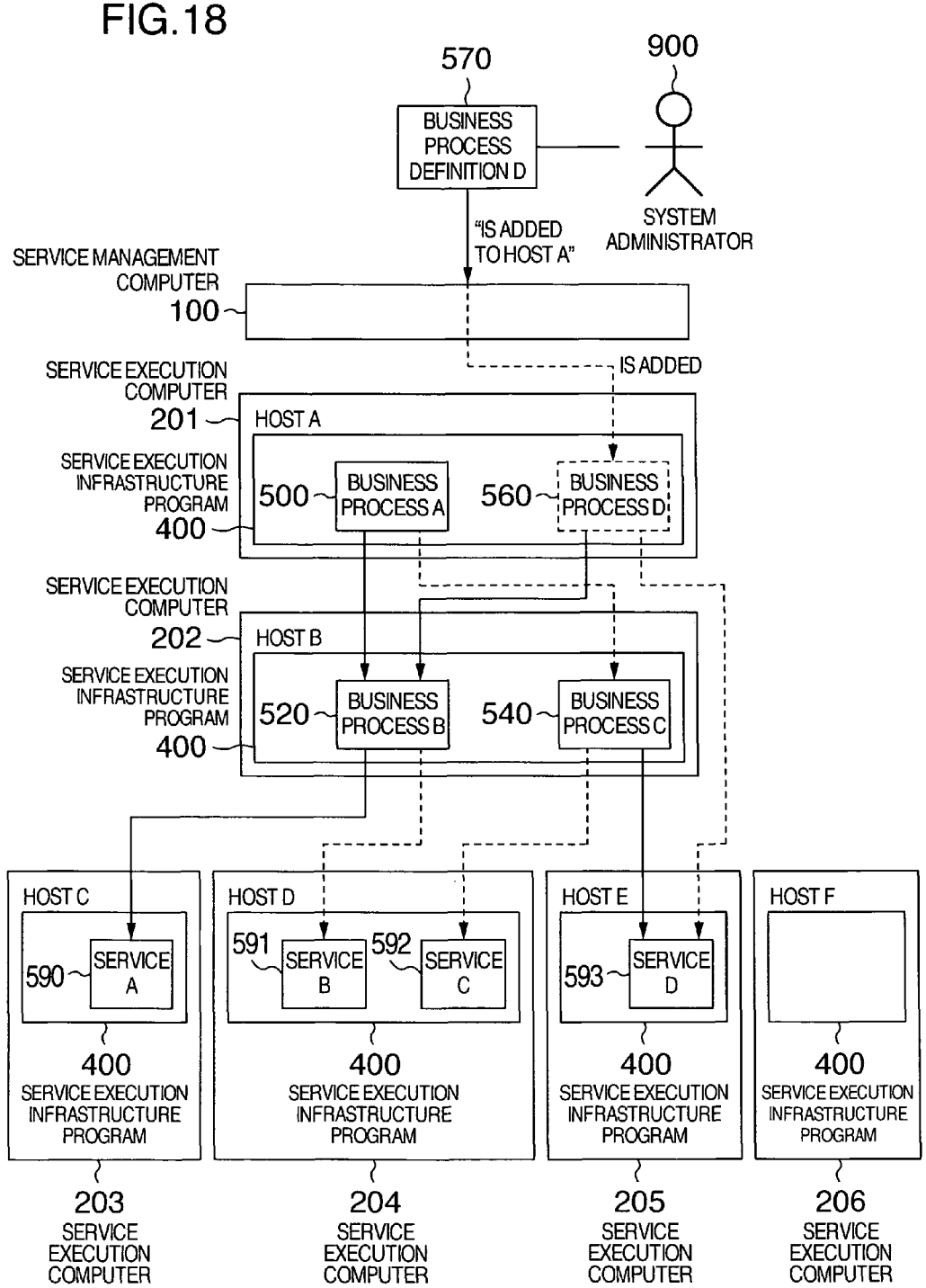

FIG.19

```
<flow>
  <receive name="BP-D" ··· >
    <source linkName="ReceiveToInvoke"/>
  </receive>
  <invoke name="invoke_BP-B" ···>
    <target linkName="ReceiveToInvoke"/>
    <source linkName="InvokeBP-BToInvokeS-D"
        transitionCondition="xxx" />
    <source linkName="InvokeBP-BToEnd"
        transitionCondition="NOT xxx" />
  </invoke>
  <invoke name="invoke_S-D" ···>
    <target "InvokeBP-BToInvokeS-D"/>
    <source linkName="InvokeS-DToEnd"/>
  </invoke>
  <reply name="reply">
    <target "InvokeBP-BToInvokeS-D"/>
    <target "InvokeS-DToEnd"/>
  </reply>
</flow>
```

570

BUSINESS PROCESS SYSTEM MANAGEMENT METHOD

INCORPORATION BY REFERENCE

This application relates to and claims priority from Japanese Patent Application No. 2005-337997 filed on Nov. 24, 2005, the entire disclosure of which is incorporated herein by reference.

BACKGROUND OF THE INVENTION

1. Field of the Invention

The present invention relates to a prediction method for predicting a computer-resource usage amount in the future.

2. Description of the Related Art

In U.S. 2005/0102674A1, the disclosure has been made concerning an associated technology for predicting a computer-resource usage amount as to an individual service by using the operation history in the past, and for securing a computer resource based on its prediction value. In this publicly-known embodiment, the disclosure has been made concerning a method for making the prediction of the computer-resource usage amount in the future from the periodicity of a load in the past, and for performing the in-advance securing of the computer resource if its prediction value has satisfied a condition set beforehand.

SUMMARY OF THE INVENTION

The present invention includes a prediction method for predicting a computer-resource usage amount. Here, this prediction method takes advantage of a call relation for a service to be extracted out of a business process definition.

BRIEF DESCRIPTION OF THE DRAWINGS

FIG. 3 is an example of the configuration diagram of a computer management table 312;

FIG. 4 is an example of the configuration diagram of a management policy table 313;

FIG. 7 is an example of the PAD diagram of an addition-operation execution unit 303;

FIG. 8 is an example of the diagram for indicating an embodiment of the business process;

FIG. 9 is an example of the PAD diagram of a call-relation analysis step 305;

FIG. 10 is an example of the PAD diagram of a computer-resource usage amount prediction step 306;

FIG. 11 is an example of the PAD diagram of a policy-based management execution step 308;

FIG. 12 is an example of the entire system configuration diagram in a second embodiment;

FIG. 13 is an example of the configuration diagram of a domain combination table;

FIG. 15 is an example of the PAD diagram of a policy-based management execution step 308 in the second embodiment;

FIG. 18 is an example of the configuration of computers in the first embodiment, and an example of the distribution state of services and business processes;

FIG. 19 is an example of contents of the business process definition D; and

DESCRIPTION OF THE INVENTION

Figure 1:
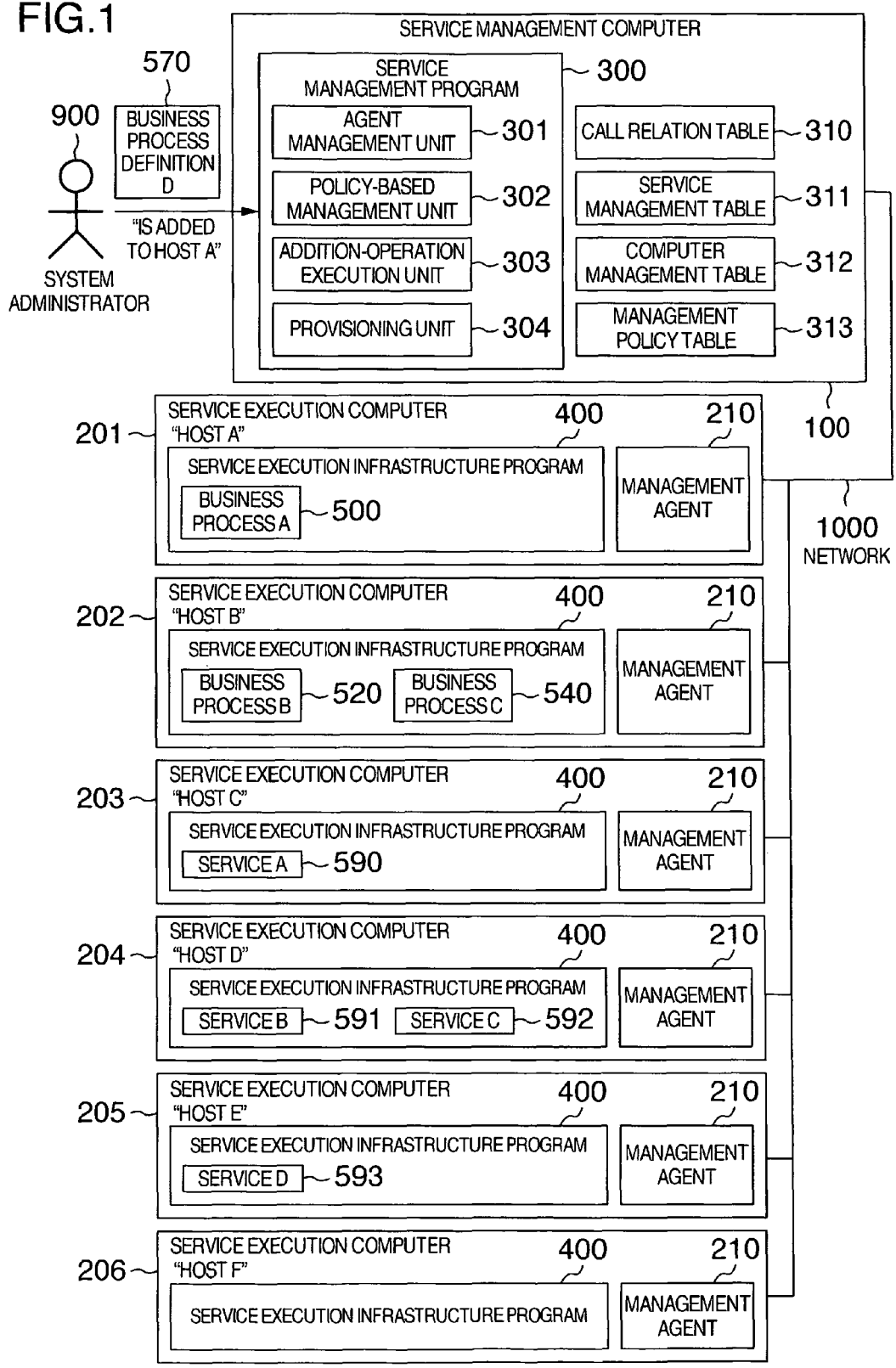
FIG. 1 is an example of the entire system configuration diagram in a first embodiment.

In recent years, in the situation where the business is changing at a dizzying pace, a system has been requested whose remaking or integration is capable of being flexibly implemented in a short time-period in response to the change in the business. Also, at the same time, in order to reduce IT investments and IT costs, it is now requested to make the most effective use of the already-existing software assets.

In view of such growing needs, attention has been focused on a concept which is referred to as "business process integration". In this business process integration, a plurality of software assets are combined using business process definition languages such as BPEL (: Business Process Execution Language), thereby making it possible to provide new functions.

Based on this concept, and by re-using the already-existing software assets as much as possible, creating newly a software asset depending on requirements, and combining these software assets, it becomes possible to construct a system for providing the new functions in a short time-period and with a low cost.

Here, a software asset is referred to as "service", and the definition on a flow for a combination of services is referred to as "business process definition". Usually, if a business process definition or a program derived from the business process definition is added to a business-process execution infrastructure program, the business process definition or the program derived therefrom becomes a service which is callable from a client. When the business-process execution infrastructure program accepts a request from the client in the state where the business process definition or the program derived therefrom has become callable, the infrastructure program identifies a business process definition or a program derived therefrom which corresponds to the request. Then, the infrastructure program executes calls for services one after another in accordance with the flow for a combination of the services described in the corresponding business process definition. The services which are made available to a client by adding a business process definition to the business-process execution infrastructure program are specially referred to as "business process".

As an example of the description method for describing a business process definition, there exists BPEL mentioned earlier. As examples of implementation of a business process and a service, there exist Enterprise JavaBeans (™), Web Services, and so on. Also, as examples of the business-process or service execution infrastructure program, there exist J2EE Servers and so on. Hereinafter, this J2EE Servers will be referred to as "service execution infrastructure program".

Since business processes are also services, it is possible to construct a new business process by combining the business processes.

What is conceivable as an effective target when applying the above-described business process integration is the entire optimization of an enterprise information system. In an already-existing typical enterprise information system, partially optimized systems exist for each department of an enterprise. Accordingly, in many cases, the enterprise includes the systems which perform more or less similar processings for each department. The inclusion of such overlapped functions results in a problem in the maintenance. Also, when trying to establish the combination among these systems in accompaniment with the change in the business, there also occurs a problem that it is impossible to connect these systems with no modification made thereto. Namely, e.g., even if data have the same meaning, the data formats differ from each other.

In view of this situation, the following solution is now becoming the mainstream: Namely, the entire enterprise information system is analyzed. Then, after extracting processings and data which are common thereto, the processings and data extracted are implemented as services. Moreover, the concept of the business process integration is introduced to combine the services, thereby reconstructing the system. This processing makes it possible to eliminate waste in the whole system, and to build up a system which is capable of flexibly adapting to the change in the business.

As the services in this case, there exist services of a variety of grains. These services range from fine-grained services, such as database access service which has no meaning in business-operation terms and which has basically the same meaning as a program component, to coarse-grained services, such as transfer service in the Internet banking which has meaning in business-operation terms. A coarse-grained service is constructed by combining finer-grained services on the basis of the business process. Also, in general, a large number of services configuring a system are located in a manner of being distributed on a plurality of computers. The combination between the services is performed by using standard protocols such as SOAP (: Simple Object Access Protocol) over HTTP (: Hyper Text Transfer Protocol) for a call between the services.

The services are hierarchically structured based on the concept of the business process integration, then combining the hierarchically-structured services in a distributed network environment. This processing makes it possible to acquire an enhancement in the maintenance of the system and the flexibility to the change in the business. In contrast to these merits, however, it is feared that there will be an increase in complexity of the management, such as allocation of computer resources in the case where the system configuration is modified.

For example, when newly adding a business process definition to the system thereby to add a new business process thereto, an already-existing service which will be used by this new business process finds an increased opportunity to be called. As a result, naturally, there will be an increase in the CPU usage ratio of a computer to which this service is in operation. Moreover, since calls for services are hierarchically structured, another service will be called from this service. Hereinafter, similarly, there will be an increase in the CPU usage ratio of a computer to which a service to be called is in operation.

In this way, the number of being called increases in a chain-reaction manner from the coarse-grained services to the fine-grained services. Accordingly, the system administrator finds it difficult to recognize which of the computer resources will run short by the addition of the business process. Moreover, if the CPU resource of a computer runs short in which a service whose number of being called will increase is in operation, and if the response time for the service increases in accompaniment therewith, the response time for an already-existing business process which will use this service will also increase. Consequently, it turns out that, finally, the response time for a business process whose call hierarchy is the highest will also increase.

In recent years, in order to accomplish proper and reasonable implementation of IT costs, an agreement (i.e., SLA: Service Level Agreement) on the lowest service offer level has come to be carried out between a service provider and a service consumer. Accordingly, in such a carry-out case, there exists a necessity for maintaining the service offer level established by SLA. In other words, there exists the following necessity: Namely, with respect to an event such as the addition of a business process as described above, a computer whose resource will run short is predicted in advance. Then, the computer resource is added based on this prediction. Incidentally, there exist a variety of types for the service offer level. Often used types are response time, throughput, availability, and so on.

According to the above-described associated technology, with respect to a periodic increase or decrease in a load at the steady time, it is possible to predict the load in advance by taking advantage of the periodicity of the load. Accordingly, it is possible to predict a computer-resource usage amount in the future from this predicted load, and to perform an allocation of the computer resources based on this prediction.

None of the periodicity, however, exists for an increase in a service load due to a non-steady event such as the addition or deletion of a business process. Consequently, in this case, it is impossible to make the prediction of an appropriate computer-resource usage amount. On account of this, in the associated technology, when the addition of a new business process is performed, the allocation of the computer resources is executed after the addition of the new business process, i.e., after an actual computer-resource usage amount has increased and has attained to a threshold value set beforehand. As a result, between a time-period ranging from detection of the exceeding for the threshold value to actual execution of the allocation of the computer resources, performance of the service lowers. This, eventually, exerts influences on performance of another business process which is using this service. As a consequence, there exists a possibility that the service offer level of the business process on which the influences have been exerted may not be observed.

It is an object of the present embodiment to solve the problem of appropriately predicting a computer-resource usage amount in the future even at the time of the addition of a business process to a system. Moreover, it is another object of the present embodiment to perform an management of finding a computer whose resource will run short from the predicted computer-resource usage amount, and of adding a computer resource.

The present embodiment includes a call relation table for storing a service call relation indicating which services a system-configuring business process will call, and the call ratios. Namely, the present embodiment includes the service management table for storing a computer-resource usage amount per service request for each system-configuring service and business process.

Furthermore, when adding a new business process to the system, at least an assumed usage frequency of the new business process is determined with an input by the system administrator. Then, the services which the new business process will call and the call ratios are extracted from the business process definition and a service call relation table. Next, for each of the services extracted, the computer-resource usage amount per service request is extracted from the service management table.

In addition, the present embodiment includes a computer-resource usage amount prediction step for calculating the computer-resource predicted usage amount, i.e., the computer-resource usage amount on each service-execution-computer basis in the case where the new business process is added, from the assumed usage frequency of the new business process determined with the input by the system administrator, the services which the new business process will call and the call ratios, a computer-resource usage amount recognizable as actual-operation information on service execution computers which will execute the services, and the computer-resource usage amount per service request determined from the service management table.

Also, in the present embodiment, there is provided a resource allocation method. This resource allocation method includes steps of calculating the computer-resource predicted usage amount by using the computer-resource usage amount prediction step, and of allocating a computer, as a new service execution computer, to a service execution computer whose computer-resource predicted usage amount has exceeded a predetermined value, the computer being different from the service execution computer before adding a new business process to the system.

According to the present embodiment, there is provided a prediction method for predicting a computer-resource usage amount with the use of a service call relation which is capable of extracted from the business process definition. This prediction method makes it possible to predict in advance the computer-resource usage amount of each system-configuring computer in the case where a new business process is added. Moreover, it becomes possible to add in advance an idle computer resource to a computer whose computer-resource usage amount prediction value has become larger than a predetermined value.

As a consequence, with respect to the non-steady event of the addition of a business process as well, it becomes possible to secure in advance a computer resource which will run short. This in-advance securing of the computer resource allows stable operation of the system.

For example, in the case of considering a system for selling goods, an order from a client is received and treated in an order-reception system, and the goods delivery is performed in a goods-distribution system, then collecting the charge in a billing system. Here, an order-placement system, the order-reception system, the goods-distribution system, and the billing system as described above are reconstructed as independent services each. Moreover, a goods sales system where these services are integrated is implemented as a business process by taking advantage of the standard technologies such as Web services and XML. By doing this, it becomes possible to easily implement such system configuration changes as replacement of each service by another service, and construction of a new business process. The examples are that, if the sales amount increases in an explosive manner, the charge-request processing is transferred to a settlement proxy system of credit company, and a goods-distribution center co-owned with another company is established thereby to integrate the goods-distribution system or to structure and execute new business processes.

When a goods sales system including a plurality of services is constructed as a business process, assume that another goods sales system is newly constructed. Namely, assume that a business process of the new goods sales system is added to the system. In this case, in this new business process as well, it is possible to use such services as an order-reception system and a billing system that the business process already-existing has been used.

In such a case, the addition of the new business process increases loads imposed on the order-reception system and the billing system. This situation results in a danger of exerting influences on the already-existing business process. Accordingly, in the present embodiment, a call relation for each service and a load on each service which the newly added business process will use are taken into consideration. This consideration prevents the already-existing business process from falling into a processing impossibility.

Hereinafter, referring to the drawings, the explanation will be given below concerning embodiments of the present invention. First, a first embodiment will be explained.

FIG. 18 illustrates an example of the configuration of computers in the present embodiment, and an example of the distribution state of services and business processes into the computers. This drawing is a one for explaining call relations for the services and the business processes, and the distribution state thereof into the computers. Accordingly, the explanation will be given later regarding insides of the computers.

In the present embodiment, service execution computers 201, 202, 203, 204, 205, and 206 for executing services and business processes, and a service management computer 100 for managing a system including these service execution computers are connected to each other via a network 1000. The network 1000 may be a local network such as LAN, or a global network such as WAN or the Internet.

FIG. 18 indicates the following distribution state: Namely, a business process A 500 is distributed to a service execution infrastructure program 400 on the service execution computer 201 "host A". A business process B 520 and a business process C 540 are distributed to a service execution infrastructure program 400 on the service execution computer 202 "host B". A service A 590 is distributed to a service execution infrastructure program 400 on the service execution computer 203 "host C". A service B 591 and a service C 592 are distributed to a service execution infrastructure program 400 on the service execution computer 204 "host D". A service D 593 is distributed to a service execution infrastructure program 400 on the service execution computer 205 "host E".

Meanwhile, FIG. 18 indicates that none of services and business processes is distributed to a service execution infrastructure program 400 on the service execution computer 206 "host F". The correspondence relationship between the computers and the services distributed thereto is stored in a computer management table 312 which will be described later.

In the present embodiment, the explanation will be given below regarding carry-out steps in the present embodiment. Here, as an example, a case is employed where a system administrator 900 executes an operation of newly adding a business process definition D 570 to the host A in the system of the configuration explained above.

Also, FIG. 18 indicates a call relation from a business process to a service or a call relation from a service to a service by using an arrow corresponding thereto. A case where the arrow for a call relation is a solid line indicates that the call will be unconditionally made without fail. A case where the arrow for a call relation is a dashed line indicates that the call will be conditionally made only when the state of input data or the service satisfies a certain condition. The explanation will be given employing, as an example, a flowchart illustrated in FIG. 8 which results from analyzing the business process definition D 570. The business process D 560, at first, will unconditionally call the business process B without fail. Accordingly, in this case, the arrow for the call relation from the business process D to the business process B is represented by the solid line. Next, after calling the business process B, the business process D makes a certain condition judgment. Then, if a certain condition is found to be satisfied, the business process D will call the service D. If not, the business process D will terminate the processing directly. In this case, since the business process D will call the service D conditionally, the arrow for the call relation from the business process D to the service D is represented by the dashed line.

Similarly, the business process A 500 will unconditionally call the business process B 520 without fail, and will call the business process C 540 conditionally. Also, the business process B 520 which is called from the business process A 500 will unconditionally call the service A 590 without fail, and will call the service B 591 conditionally.

After the business process D 560 has been added, the business process B 520 and the service D 593 increase in their number of being called. Also, further, the service A 590 and the service B 591 which are called from the business process B 520 increase in their number of being called. In particular, the service A 590 will be called from the business process B 520 without fail, and the business process B 520 will be called from the business process D 560 without fail. As a result, the increases in their number of being called, which accompany the addition of the business process D 560, are large and conspicuous.

At this time, assuming that the service A 590 is executing a processing which requires the CPU resource in large amounts, the addition of the business process D 560 results in a possibility that the CPU resource of the computer 203 of the service A 590 may run short. Here, however, the newly added business process definition D 570 provides only the recognition that the business process B 520 and the service D 593 will be called. This situation requires that the system administrator or the like recognize the hierarchy of the call relations in some other way. However, if the hierarchy of the call relations from the business process D 560 to the service A 590 is deep, even the system administrator finds it difficult to easily recognize that the CPU resource of the computer 203 of the service A 590 will run short.

In the present embodiment, this problem is solved by managing the call relations and call ratios for the business processes and services of the entire system extracted from the business process definition, and by tracing the call relations thereby to predict the computer-resource usage amount of each computer in the case where the new business process is added. Also, further, the explanation will be given concerning a method of newly adding a computer resource on the basis of the predicted computer-resource usage amount.

FIG. 1 illustrates an example of the system configuration in the present embodiment.

Here, the system includes the service execution computers 201, 202, 203, 204, 205, and 206, i.e., general-purpose computers such as personal computers (which, hereinafter, will be referred to as "PC"), the service execution infrastructure programs 400, i.e., server programs executed on the service execution computers 201, 202, 203, 204, 205, and 206 for executing business processes and services, and management agents 210 for performing information exchanges with a service management program 300 on the service management computer 100.

An management agent 210 receives a service addition request or a business-process-definition addition request from the service management program 300 on the service management computer 100, thereby performing the addition of the service or the business process definition to the corresponding service execution infrastructure program 400. Also, further, the management agent 210 acquires the performance information and execution-time information for each service execution infrastructure program 400 or the performance information and execution-time information for each service or business process distributed thereto. Moreover, the management agent 210 acquires the resource usage situation of the computer in which the management agent 210 itself is in operation. Then, the management agent 210 periodically transmits these pieces of information to the service management program 300.

In the present embodiment, of computer resources, the CPU resource is dealt with in particular. Consequently, the management agent 210 acquires the average CPU usage ratio as the resource usage situation of the computer, and the CPU usage ratio per request as the performance information for each service or business process, then transmitting these pieces of information to the service management program 300. Also, as information to be acquired regardless of the computer resources dealt with, the management agent 210 acquires, for each service, a set of the number of times in which each business process has been called and the number of times in which each business process has called the service, i.e., the execution-time information for each business process. Then, the management agent 210 transmits the information on the set to the service management program 300.

These pieces of information transmitted from the management agents 210 to the service management program 300 are information used when the present embodiment is carried out. The computer-resource usage amount in the future is calculated based on these actual-operation information. As the computer resources to be dealt with, in addition to the above-described CPU, whatever resource, e.g., a memory or disc, is preferable as long as its usage amount or usage ratio is generally acquirable.

The service execution infrastructure programs 400 are implementable using commercially-available application serves such as J2EE Servers. The services and business processes are implementable using Enterprise JavaBeans or Web Services. In this case, Enterprise JavaBeans or Web Services, i.e., the implementation of a business process, performs a processing of calling services one after another while referring to the business process definition and following a flow described therein.

Also, in the present embodiment, the service management computer 100 is configured by the general-purpose computer such as PC and the service management program 300 according to present embodiment which is executed on the general-purpose computer. When adding a service or a business process definition to the service execution infrastructure program 400 on a certain service execution computer within the system, the system administrator 900 performs an addition operation of the service or the business process definition to the service management program 300. Concretely, the system administrator 900 inputs information for identifying the service or the business process definition and the service execution infrastructure program 400 to which the service or the business process definition will be added. In the present embodiment, only one service execution infrastructure program 400 is booted up on one service execution computer. Accordingly, the name (i.e., computer name) for identifying the service execution computer is used as the information for identifying the service execution infrastructure program 400.

When the addition operation has been executed, the service management program 300, based on the computer name inputted, transmits a service addition request or a business-process-definition addition request to the management agent 210 on the corresponding service execution computer. As a consequence, the management agent 210 performs the addition of the service or the business process definition to the service execution infrastructure program 400 on the corresponding target service execution computer. The calculation on the prediction value of the computer-resource usage amount according to present embodiment is carried out between a time-period ranging from a point-in-time when the system administrator 900 had performed the addition operation of the business process definition to the service management program 300 to a point-in-time when the business process definition has been actually added to the service execution infrastructure program 400. Then, the securing of the computer resource which will run short is executed in advance based on this prediction value.

Figure 2:
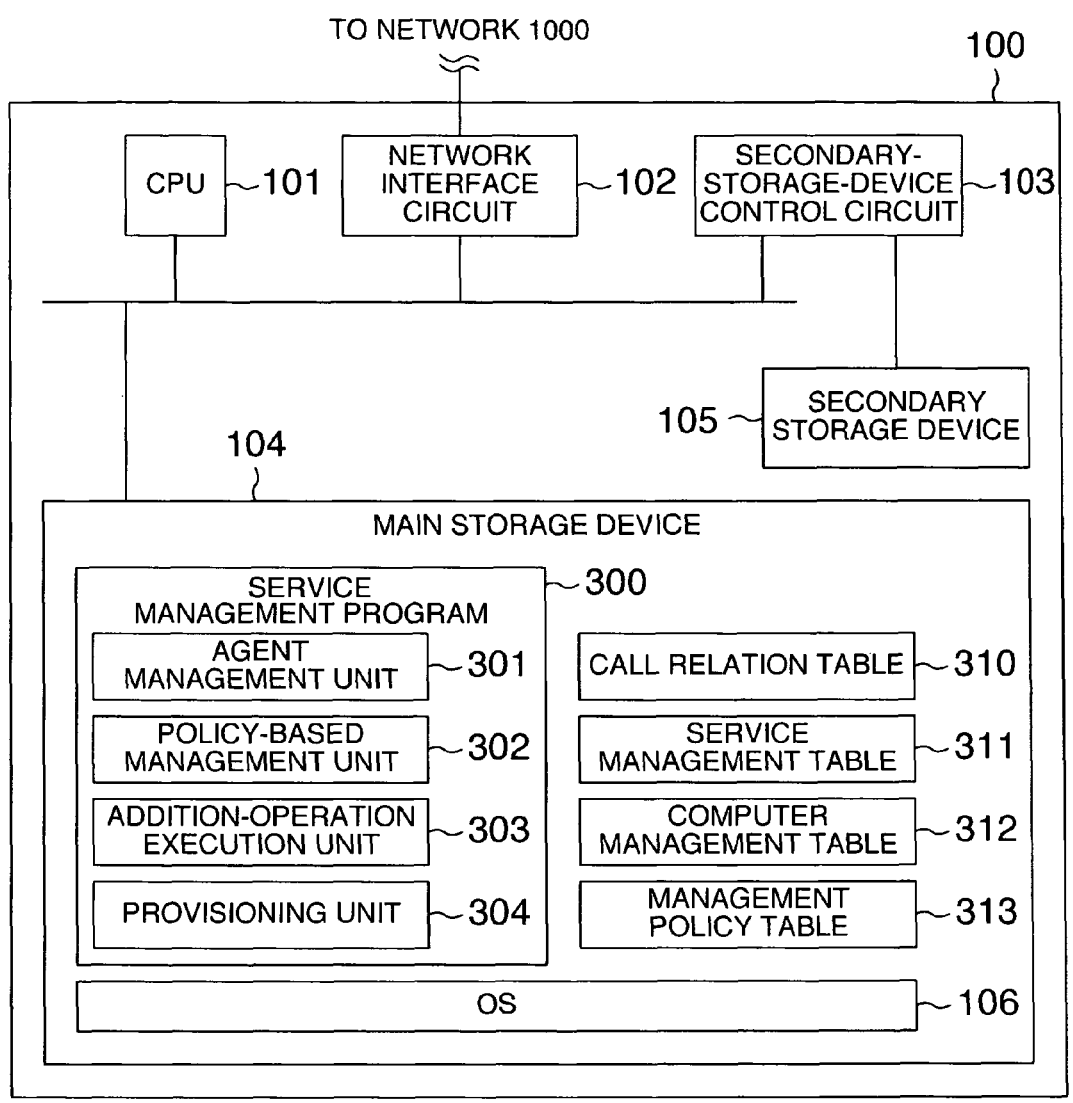
FIG. 2 is an example of the configuration diagram of a service management computer 100.

In order to further explain the carry-out mode of the present embodiment, FIG. 2 illustrates and explains an example of the configuration of the service management computer 100. In FIG. 2, the service management computer 100 includes a CPU 101, a network interface circuit 102, a secondary-storage-device control circuit 103, a main storage device 104, and a secondary storage device 105. The network interface circuit 102 transmits/receives a message on the network in accordance with an instruction from the CPU 101. The secondary-storage-device control circuit 103 inputs/outputs data into/from the secondary storage device 105 in accordance with an instruction from the CPU 101. Also, the main storage device 104 stores thereon the service management program 300 and an OS (: operating system) 106. Although the main storage device 104 is memory or the like, and the secondary storage device 105 is magnetic storage device such as hard disc or optical and magnetic storage device such as CD and DVD drives, the devices 104 and 105 are not limited thereto.

In the configuration within the main storage device 104 of the service management computer 100, the commercially-available general-purpose OS is usable as the OS 106. Meanwhile, the service management program 300 is the program for carrying out the present embodiment.

The service management program 300 includes an agent management unit 301, a policy-based management unit 302, an addition-operation execution unit 303, and a provisioning unit 304. The execution of the service management program 300 by the CPU 101 implements these respective processing units. A call relation table 310, a service management table 311, a computer management table 312, and a management policy table 313 are stored in the main storage device 104, and are managed by the service management program 300.

The hardware configuration of each of the service execution computers 201, 202, 203, 204, 205, and 206 is basically the same as the hardware configuration of the service management computer 100 illustrated in FIG. 2. What differs from the service management computer 100 is as follows: Namely, in each of the service execution computers 201, 202, 203, 204, 205, and 206, the OS 106, the service execution infrastructure program 400, the services or the business processes which are added to, managed by, and executed by the service execution infrastructure program 400, and the management agent 210 are expanded on the main storage device 104, and are executed by the CPU. The management agent 210 acquires the usage amounts or usage ratios of the computer resources, such as usage ratio of the CPU 101 of the computer (i.e., CPU usage ratio), usage amount of the main storage device 104 (i.e., memory usage amount), and usage amount of the secondary storage device 105 (i.e., hard-disc usage amount). Then, the agent 210 transmits these pieces of information to the service management computer 100.

Incidentally, the management agent 210 is the program, and is executed by the CPU. Not being limited thereto, however, the agent 210 may also be implemented using hardware (such as integrated-circuit chip) as long as the agent 210 implemented in this way is capable of acquiring the computer-resource usage amounts.

Hereinafter, while explaining the carry-out steps in the present embodiment, the explanation will be given below concerning roles of the respective configuration components of the above-described service management program 300. The carry-out steps in the present embodiment include two phases, i.e., a system construction phase as the carry-out preparation stage and a service/business-process-definition addition phase as the carry-out stage in the present embodiment.

First of all, in the system construction phase, at first, the system administrator 900 prepares one or more service execution computers and one service management computer which configure the system. In the present embodiment, as illustrated in FIG. 1, the six service execution computers 201, 202, 203, 204, 205, and 206 and the one service management computer 100 are prepared. Moreover, an OS 107 and the service management program 300 are installed into the service management computer 100. Also, the OS 106, the service execution infrastructure program 400, and the management agent 210 are installed into the each of the service execution computers 201, 202, 203, 204, 205, and 206.

Next, the system administrator 900 performs the configuration definition on the system with respect to the service management program 300 on the service management computer 100. Concretely, as regards the service execution computers 201, 202, 203, 204, 205, and 206 which configure the system, the system administrator 900 inputs, into the service management program 300, the computer names and the addresses for performing communications with the management agents 210 on the service execution computers. As the input method for inputting these pieces of information, the input may be performed by providing an inputting GUI on the service management program 300. Otherwise, these pieces of information may be described into a file, then being read by the service management program 300.

When the above-described input has been performed by the system administrator 900, the service management program 300 registers the computer names inputted by the system administrator 900 into a computer name 335 on the computer management table 312 illustrated in FIG. 3. Also, the program 300 registers, into an agent address 336, the addresses inputted by the system administrator 900 for performing the communications with the management agents 210.

In the present embodiment, the computer names of the six service execution computers 201, 202, 203, 204, 205, and 206 are defined as the host A, host B, host C, host D, host E, and host F, respectively. Also, the explanation will be given here regarding the other columns on the computer management table 312.

An in-operation service 337 stores a service name or a business process name which is in operation on each computer. Every time a service or a business process is added to or is deleted from a service execution computer, the service or the business process is added to or is deleted from this column of the in-operation service 337. An average CPU usage ratio 338 indicates the average CPU usage ratio of each computer. As described earlier, this value is periodically transmitted from the management agent 210 on each computer. Accordingly, the agent management unit 301, which receives this value, updates this value periodically.

A predicted CPU usage ratio 339 is a column which stores therein the prediction value of the CPU usage ratio after the addition of a business process. This prediction value is calculated by the provisioning unit 304 according to the present embodiment. Incidentally, the computer management table 312 illustrated in FIG. 3 indicates the state after the addition of the business process D is performed (which is the scenario in the present embodiment).

Furthermore, in the system construction phase, the system administrator 900 sets the management policy on the system, which will be used in the policy-based management later. Concretely, the system administrator 900 inputs values in an event 340, an execution condition 341, and an action 342 on the management policy table 313 illustrated in FIG. 4. The event 340 indicates event information which the policy-based management makes reference to. The execution condition 341 indicates a threshold value and a condition based on which the action 342 is to be executed with respect to the event 340. Moreover, the action 342 indicates processing contents which are to be executed if the execution condition 341 is satisfied.

In this way, the following management is referred to as the policy-based management: Namely, an event and an execution condition based on which a certain action is to be executed are set in advance. Then, it is judged at a certain timing whether or not a value pointed out by the event satisfies the execution condition. If the execution condition is found to be satisfied, the predetermined action will be executed.

In the present embodiment, the predicted CPU usage ratio 339 on the computer management table 312 is set as the event 340. The execution condition 341 for each event is set as a condition that the predicted CPU usage ratio is larger than 70%. The action 342 is set as an action of adding a computer resource. These settings are based on an assumption that the system administrator 900 has made the following judgment: Namely, if the predicted CPU usage ratio becomes larger than 70%, influences will be exerted on responses of the services or the business processes which are in operation on the computer. Accordingly, it is required to add the computer resource to such a computer.

In the present embodiment, as described above, the predicted CPU usage ratio 339 after the addition of a business process, which is calculated by the present embodiment, is dealt with as an event of the policy-based management. Then, the policy-based management is carried out before the addition of the business process. This processing makes it possible to execute the action of adding a new computer resource to the computer whose predicted CPU usage ratio is larger than 70%. In this way, it becomes possible to secure the computer resource before the addition of the business process, i.e., before the actual rise in the load.

In the present embodiment, although the CPU is assumed as the computer resource, it is also possible to assume another computer resource such as a memory or disc. For example, consider a case where it is feared that the memory may run short in the system management. At this time, a predicted memory usage amount is calculated as the predicted computer-resource usage amount in accordance with the present embodiment. Then, a management policy is defined where the predicted memory usage amount is dealt with as an event. Next, the policy-based management is carried out before the addition of a business process. This processing makes it possible to add the computer resource in accordance with a condition set in advance in the management policy.

The explanation will be given later regarding processing contents performed by the policy-based management unit 302 for applying the policy-based management to the predicted CPU usage ratio 339 in the present embodiment.

In the above-described system construction phase, the configuration definition on the system is performed. Then, the service management program 300 starts communications with the management agents 210 on the service execution computers which configure the system. The component in the service management program 300 which performs the communications with the management agents 210 is the agent management unit 301.

The role of the agent management unit 301 is as follows: Namely, receiving the performance information and execution-time information on each service or business process or each service execution computer transmitted from the management agents 210 on the service execution computers 201, 202, 203, 204, 205, and 206 which configure the system, and reflecting these pieces of information onto the call relation table 310, the service management table 311, and the computer management table 312.

Figure 5:
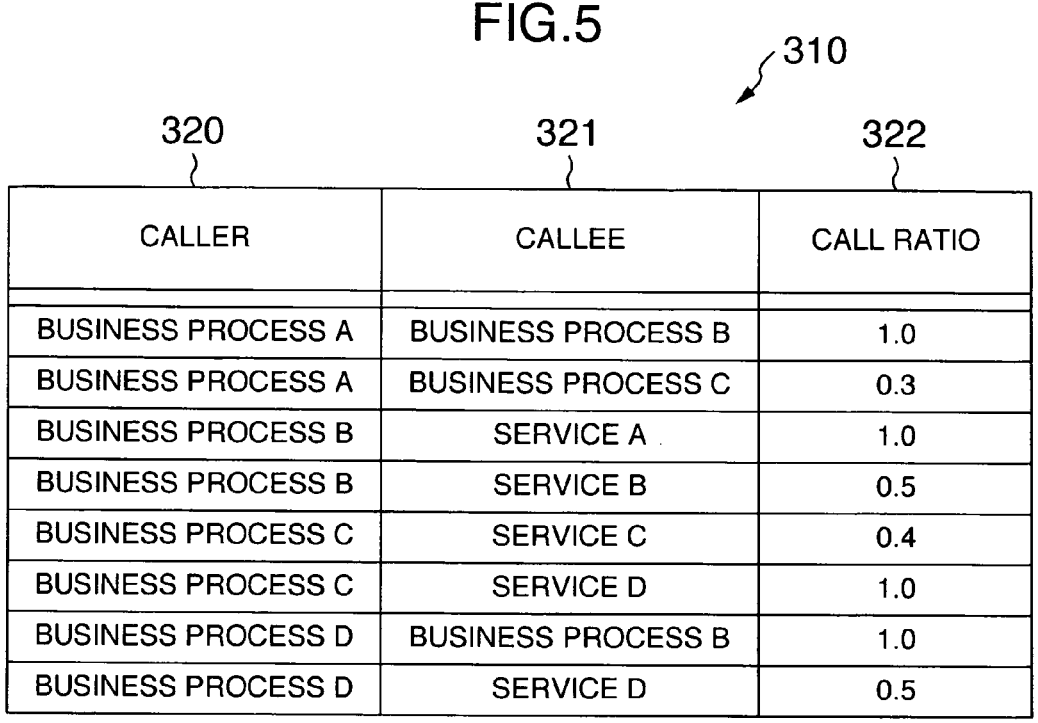
FIG. 5 is an example of the configuration diagram of a call relation table 310.

Concretely, the business process number of being called and the service number of being called for each pair of a caller business-process name and a callee service name transmitted from the management agents 210 are reflected onto a call ratio 322 of a record on the call relation table 310 illustrated in FIG. 5. Here, in this record, a caller 320 and the caller business-process name coincide with each other, and a callee 321 and the callee service name coincide with each other.

Similarly, the average CPU usage ratio for each service execution computer transmitted from the management agents 210 is reflected onto the average CPU usage ratio 338 on the computer management table 312. Also, the per-instance CPU usage ratio for each pair of a computer name and a service name transmitted from the management agents 210 is reflected onto a per-instance CPU usage ratio 332 of a record on the service management table 311 illustrated in FIG. 6. Here, in this record, a computer name 330 and the computer name transmitted coincide with each other, and a service name 331 and the service name transmitted coincide with each other. The system information such as the CPU usage ratio and the memory usage ratio on a service or a business process are transmitted from each service execution computer after the service or the business process has been added to each service execution computer.

Figure 6:
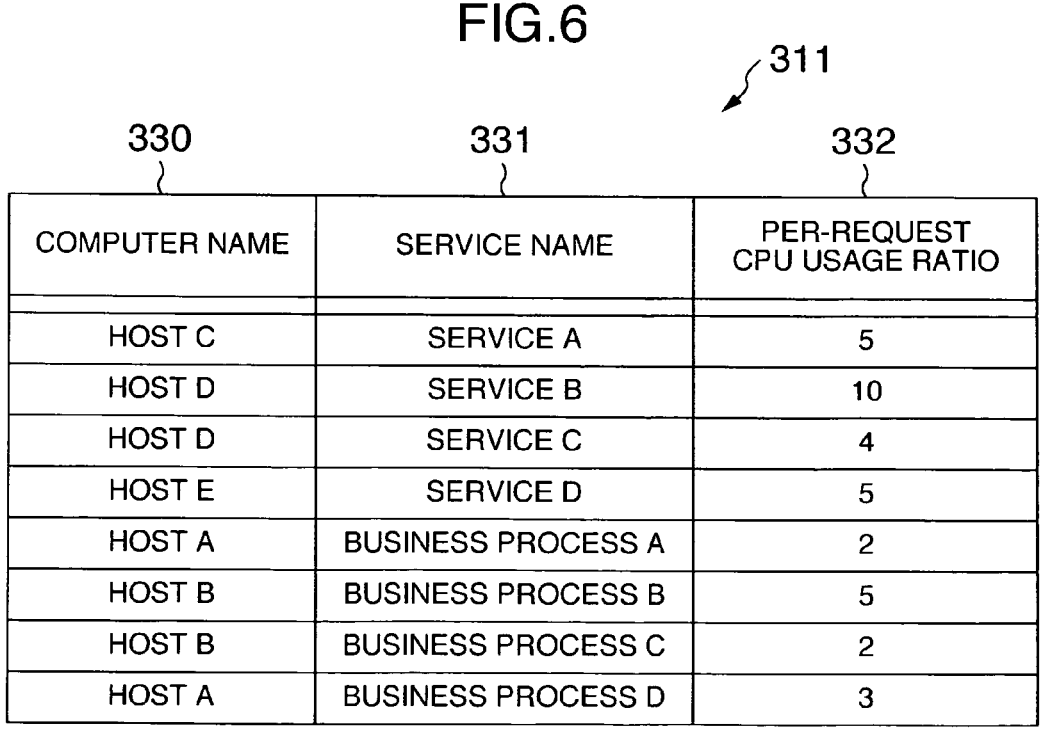
FIG. 6 is an example of the configuration diagram of a service management table 311.

The average CPU usage ratio 338 illustrated in FIG. 3 and the per-instance CPU usage ratio 332 illustrated in FIG. 6 are updated using the actual-operation information transmitted from these management agents 210. The actual-operation information are used in the prediction-value calculation of the computer-resource usage amount in the provisioning unit 304 which will be described later. By taking advantage of the actual-operation information in the prediction-value calculation of the computer-resource usage amount, it becomes possible to enhance the prediction accuracy.

Incidentally, the agent management unit 301 and the management agents 210 are implementable using commercially-available management tools.

Next, the explanation will be given below concerning the service/business-process-definition addition phase, i.e., the carry-out stage in the present embodiment. In the service/business-process-definition addition phase, the system administrator 900 specifies a service or a business process definition to be added, its name (both of the names are referred to as "service names"), and a computer name of the addition destination, thereby executing the addition operation of the service or the business process definition to the service management program 300. Having received the execution of the addition operation, the service management program 300 accepts the input from the system administrator 900, then calling the addition-operation execution unit 303 of the service management program 300. A PAD diagram employed in FIG. 7 illustrates the basic processing flow implemented by the addition-operation execution unit 303.

(step 3031) Based on the service name of a service or a business process definition to be added, and a computer name of the addition destination, a record is added onto the service management table 311, then storing the service name 331 and the computer name 330. Also, the information in the in-operation service 337 on the computer management table 312 is updated.

(step 3032) If the addition target to be added by the addition operation is the service, a step 3033 will be executed. Meanwhile, if the addition target is the business process definition, a step 3034 will be executed.

(step 3033) The computer name and the service specified by the system administrator 900 are transferred to the management agent 210, thereby executing and terminating the addition of the service.

(step 3034) The provisioning unit 304 according to the present embodiment is executed, and a step 3035 is executed.

(step 3035) The computer name and the business process definition specified by the system administrator 900 are transferred to the management agent 210, thereby executing and terminating the addition of the business process definition.

Next, the explanation will be given below regarding the provisioning unit 304 which is to be executed in the addition-operation execution unit 303 if the addition target to be added by the addition operation is the business process definition.

Figure 16:
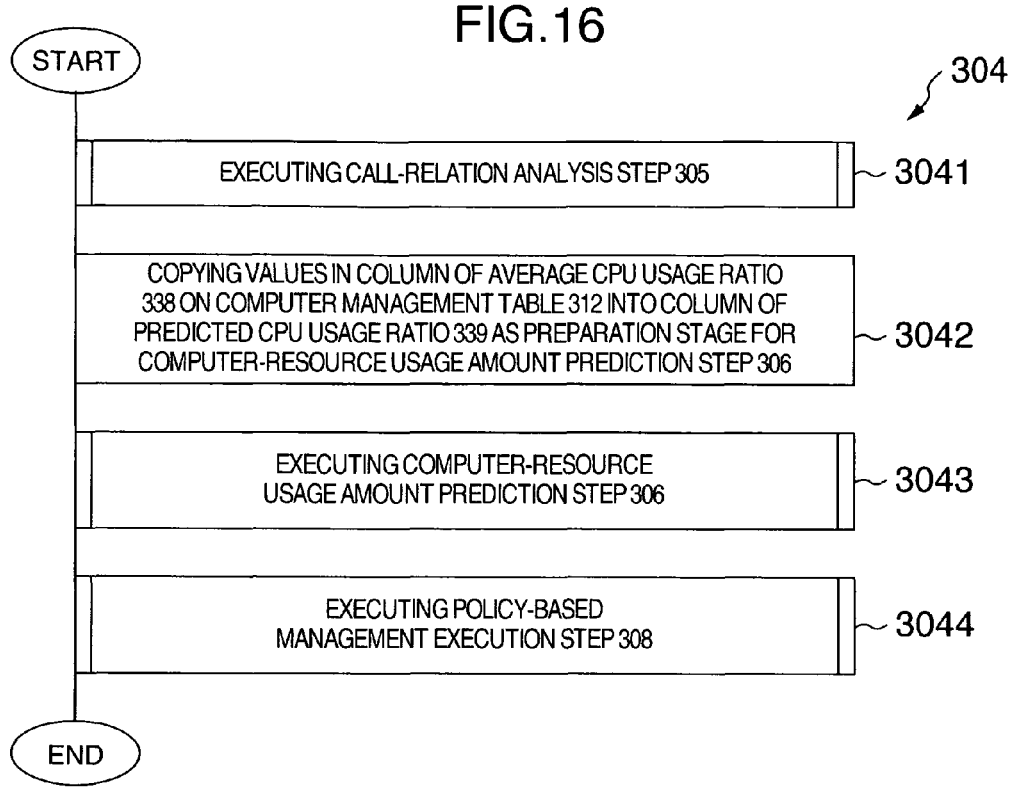
FIG. 16 is an example of the PAD diagram of a provisioning unit.

A PAD diagram employed in FIG. 16 illustrates the basic processing flow implemented by the provisioning unit 304.

(step 3041) A call-relation analysis step 305 is executed. This step 305 analyzes the business process definition to be added by the addition operation, identifies services to be called from this business process, and reflects this analysis result onto the call relation table 310. The call-relation analysis step 305 performs a processing of determining assumed usage frequency of the business process, and, for each service to be conditionally called from the business process, determining assumed usage ratio of the service. After the call-relation analysis step 305 has been executed, a step 3042 is executed.

(step 3042) As a preparation stage for a computer-resource usage amount prediction step 306, values in the column of the average CPU usage ratio 338 on the computer management table 312 are copied into the column of the predicted CPU usage ratio 339, then executing a step 3043.

(step 3043) The computer-resource usage amount prediction step 306 is executed. This step 306 traces the call relations from the business process to be added and based on the call relation table 310, calculates the predicted CPU usage ratio of each computer after the addition of the business process, and stores the calculation result into the predicted CPU usage ratio 339 on the computer management table 312. After this step has been executed, a step 3044 is executed.

(step 3044) A policy-based management execution step 308 is executed. This step 308 applies the policy-based management to the predicted CPU usage ratio 339 on the computer management table 312, and performs the addition of a computer resource to a computer which satisfies a management policy set in advance.

Furthermore, hereinafter, referring to PAD diagrams, the explanation will be given below concerning the call-relation analysis step 305, the computer-resource usage amount prediction step 306, and the policy-based management execution step 308.

First, referring to an example of the PAD diagram in FIG. 9, the explanation will be given below regarding the call-relation analysis step 305.

(step 3051) The services which are to be called from the business process to be added and the call relations for the services from the business process are extracted by analyzing the business process definition. The call relations, as indicated in the flowchart in FIG. 8, are information for indicating an order of calls for the services and based on what conditions the services will be called. This step will be described later. After this processing has been terminated, a step 3052 is executed.

Figure 20:
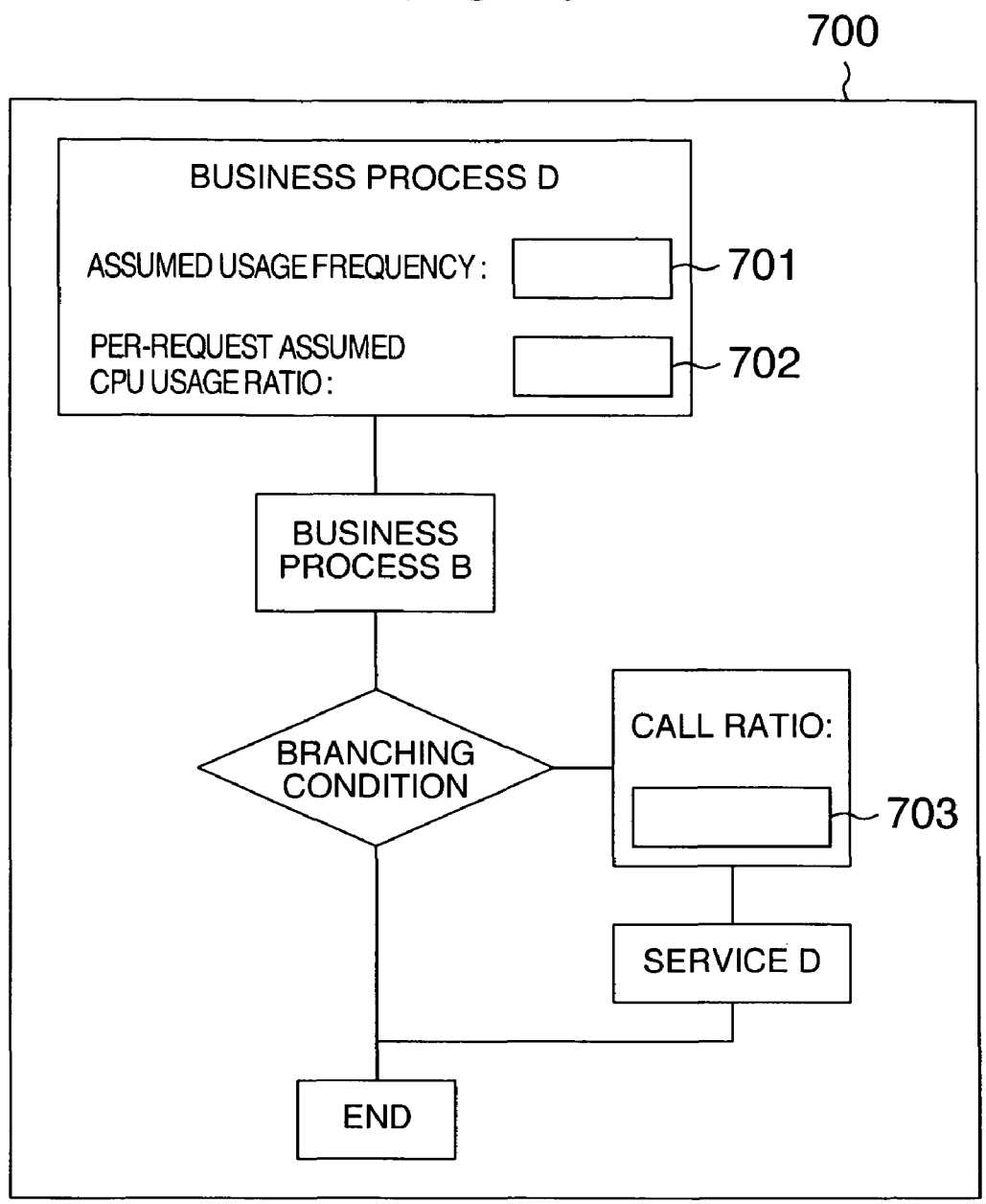
FIG. 20 is an example of the configuration diagram of a service call-relation inputting GUI.

(step 3052) A service call-relation inputting GUI 700 as is illustrated in FIG. 20 is created based on the services and the call relations for the services extracted at the step 3051. Then, the system administrator 900 is requested to input the assumed usage frequency and assumed CPU usage ratio per business process to be added, and the call ratio for a service which will be conditionally called. The call ratio for a service which will be unconditionally called without fail is set at 1.0. The system administrator 900 inputs these values by taking into consideration business-operation contents of the business process to be added. Here, the assumed CPU usage ratio per business process may be automatically calculated from the number of the services, then employing the resultant value as the default value. Also, with respect to the call ratios for the services as well, the call ratio for a service which will be unconditionally called without fail is set at 1.0, and then, this call ratio 1.0 may be multiplied by a certain ratio (e.g., 0.5) every time a conditional branch exists until the call for the service, then employing the resultant value as the default value. Setting the default values by the mechanical method in this way more or less results in a deterioration in the accuracy of the prediction calculation of the computer-resource usage amount which will be performed later. This kind of method, however, makes it possible to omit the input by the system administrator.

In this way, when a certain ratio is automatically set to a conditional branch, it becomes possible to add a record on the call relation table 310 without presenting to the user the GUI (: graphical user interface) as is illustrated in FIG. 20.

(step 3053) With respect to the call relations for the services extracted at the step 3051, a record is added onto the call relation table 310. Then, the business process name to be added is stored into the caller 320, the service names extracted are stored into the callee 321, and the call ratios for the services determined at the step 3052 are stored into the call ratio 322. Incidentally, if one and the same service is called from the business process in plural times, a value resulting from totalizing the call ratios for the respective services is stored into the call ratio 322 on the call relation table 310. Accordingly, the value in the call ratio 322 may become larger than 1.

(step 3054) A record for the business process to be added is added onto the service management table 311. Then, the assumed CPU usage ratio per business process determined at the step 3052 is stored into the per-instance CPU usage ratio 332 on the service management table 311.

Here, the explanation will be given below regarding the analysis of the business process definition at the above-described step 3051. FIG. 19 illustrates contents of the business process definition D 570 as an example of business processes described using BPEL.

In BPEL, the processing steps of a business process are described by XML, and a tag in XML is referred to as "activity". A <flow> activity is a tag for defining activities emerging as child elements such that the activities are executed in parallel. Within the <flow> activity, there exist a <receive> activity, an <invoke> activity, and a <reply> activity. When a request is received by the <receive> activity, an activity to be executed next is determined. In this case, an activity which has, as a child element, a <target> activity having the name of value of the LinkName attribute coinciding with value of the LinkName attribute of a <source> activity which is a child element of the <receive> activity becomes the activity to be executed next. Namely, the <invoke> activity which has the Name attribute of invoke_BP-B is the activity to be executed next. Since this <invoke> activity indicates that this business process will call another service, detecting the emergence of the <invoke> activity makes it possible to recognize the call relations for the services.

The information on the callee services is described in the attribute of the <invoke> activity. Here, it is assumed that the business process B will be called by this <invoke> activity. Also, a plurality of <source> activities exist as child elements of this <invoke> activity, and further, the <source> activities have an attribute value of transitionCondition. This indicates that, if the condition expression for the transitionCondition attribute value is "true", the link of the corresponding <source> activity will be executed. Here, two <source> activities exist, and the condition expression for the transitionCondition attribute value is mutually exclusive. This indicates that the conditional branch will be executed. The branching destination is either an <invoke> activity which has a <target> activity whose LinkName attribute value is invoke_S-D as a child element or a <reply>activity. Executing the former <invoke> activity (which is assumed to be an activity for calling the service D) of the branching destination results in implementation of a link with the <reply> activity.

This indicates the following situation: Namely, this business process definition D 570 calls the business process B at first. Next, if a certain condition is satisfied, the definition D 570 calls the service D, then replying to the client. Meanwhile, if a certain condition as described above is not satisfied, the definition D 570 replies to the client directly. Namely, this situation may be represented using the flowchart as is illustrated in FIG. 8.

Also, the explanation will be given below regarding an example of the service call-relation inputting GUI 700 in FIG. 20 presented to the system administrator at the above-described step 3052. FIG. 20 is an example of the screen where several system-manager inputting textboxes are added to the flowchart illustrated in FIG. 8, i.e., the analysis result of the business process definition at the above-described step 3051. As inputting textboxes for the business process to be added, a business-process assumed usage frequency 701 and a per-instance assumed CPU usage ratio 702 are added. Moreover, when calling a service or a business process after a conditional branch, an inputting textbox for a call ratio 703 is added on the branching line. In this way, the system administrator 900 is requested to input the information on the business process itself to be added, and the call ratios from the business process to be added to the services. This allows arrangement of the preparation for the prediction calculation of the computer-resource usage amount in the present embodiment.

Based on the call-relation analysis step 305 described so far, the call relations from the business process to be added to the system to the services are all stored into the call relation table 310. The call relation table 310 illustrated in FIG. 5 indicates the state after the system administrator 900 had executed the addition operation of the business process definition D 570 explained earlier using FIG. 19 and FIG. 8, and as a result, the call-relation analysis step 305 has been executed. The call from the business process D to the business process B is unconditionally performed without fail. Accordingly, the value of 1.0 is stored into the call ratio 322. Also, the call from the business process D to the service D is conditionally performed. Consequently, the system administrator 900 is requested to input the corresponding call ratio, and as a result, the value of 0.5 is stored into the call ratio 322.

Also, the call ratios in the other records on the call relation table 310 are, as described earlier, the actual-operation information transmitted from the management agents 210. Namely, the call relation table 310 indicates that the business process A has actually called the business process B without fail, and has called the business process C conditionally with the call ratio of 0.3. Also, similarly, the table 310 indicates that the business process B has actually called the service A without fail, and has called the service B conditionally with the call ratio of 0.5. Also, the table 310 indicates that the business process C has called the service C conditionally with the call ratio of 0.4, and has called the service D without fail.

The above-described call relations that which of the business processes or services a certain business process or service has called may be identified by tracing the service names and business process names stored in the caller 320 and the callee 321 on the call relation table 310. Incidentally, what identifies the services or business processes on the call relation table 310 may be not only "the names" such as the service names and business process names, but also identifiers which allow identification of the services or business processes, such as the IDs and address information.

By taking advantage of the actual-operation information as the call ratios for the already-operating business processes and services other than the call ratios from the business process to be added to the services, it becomes possible to enhance the accuracy of the prediction calculation of the computer-resource usage amount in the computer-resource usage amount prediction step 306 which will be explained next.

For example, in the flowchart illustrated in FIG. 8, when newly adding the business process D, a predetermined value, e.g., 0.5, is inputted as the call ratio for the service D. However, after the business process D had been actually added, and has been in operation for a certain extent of time-period, the call ratio with which the business process D will call the service D may be calculated from the actual-operation information by calculating the execution number-of-times of the service D with respect to the execution number-of-times of the business process D. Using the call ratio for the service D determined from this actual-operation information, the call ratio 322 on the call relation table 310 is updated. The updating of the call relation table 310 may be periodically performed, or may be performed when a predetermined event occurs, such as when a business process is added or executed.

Next, referring to an example of the PAD diagram in FIG. 10, the explanation will be given below concerning the computer-resource usage amount prediction step 306, which will be executed after the call-relation analysis step 305.

When calling the computer-resource usage amount prediction step 306, the step 306 is called by employing, as the arguments, the service name of an analysis target and an increase amount in the usage frequency of the analysis target. Here, the service name of an analysis target is defined as the name of a business process to be added, and the increase amount in the usage frequency of the analysis target is defined as the assumed usage frequency which the system administrator 900 has been requested to input at the call-relation analysis step 305.

(step 3061) The service name of an analysis target and an increase amount in the usage frequency of the analysis target, i.e., the inputs at the computer-resource usage amount prediction step 306, are acquired, then executing a step 3062.

(step 3062) The service management table 311 is retrieved with the service name of the analysis target used as the key, then executing a step 3063.

(step 3063) The increase amount in the usage frequency determined at the step 3061 is divided by the number of records found out by the retrieval at the step 3062, and the resultant division value is defined as an individual usage-frequency increase amount, then executing a step 3064.

(step 3064) Steps 3065 to 3068 are repeated with respect to the records found out by the retrieval at the step 3062. When the repetition has been terminated, a step 3069 is executed.

(step 3065) The computer name 330 and the per-instance CPU usage ratio 332 are acquired from each record of the retrieval result at the step 3062, then executing a step 3066.

(step 3066) Records having computer names that coincide with the computer name determined at the step 3065 used as the key are retrieved on the computer management table 312 thereby to obtain the predicted CPU usage ratio 339 in each record of the retrieval result as a temporary predicted CPU usage ratio. After that, a step 3067 is executed.

(step 3067) The per-instance CPU usage ratio 332 determined at the step 3065 is multiplied by the individual usage-frequency increase amount determined at the step 3063, thereby determining a predicted increase amount in the CPU usage ratio, and then executing a step 3068.

(step 3068) A value resulting from adding the predicted increase amount in the CPU usage ratio determined at the step 3067 to the temporary predicted CPU usage ratio determined at the step 3066 is stored into the predicted CPU usage ratio 339 on the computer management table 312.

(step 3069) Records in which the service of the analysis target coincides with the caller 320 are retrieved on the call relation table 310, then executing a step 3070.

(step 3070) A step 3071 is repeated with respect to the records found out by the retrieval at the step 3069. When the repetition has been terminated, the computer-resource usage amount prediction step 306 is terminated.

(step 3071) The callee 321 is determined from each record of the retrieval result at the step 3069, then defining this callee 321 as a new analysis target. Moreover, the call ratio 322 is determined from each record of the retrieval result, then being multiplied by the increase amount in the usage frequency acquired at the step 3061. Furthermore, the computer-resource usage amount prediction step 306 is recursively called by defining the resultant multiplication value as an increase amount in the usage frequency of the new analysis target.

The computer-resource usage amount prediction step 306 explained so far is executed with the business process to be added defined as the first analysis target. Then, after calculating the predicted CPU usage ratio of the addition-destination computer of the analysis target, the service to be called from the analysis target is determined based on the call relation table 310. Next, the computer-resource usage amount prediction step 306 is recursively called with the service defined as the new analysis target. This method makes it possible to calculate the prediction values of the CPU usage ratios after the addition of the business process with respect to all the addition-destination computers of the services which are to be directly or indirectly called from the business process to be added.

For example, when adding the business process definition D to the host A, according to the above-described explanation, the computer-resource usage amount prediction step 306 is executed with the analysis target defined as the business process D. Then, at first, the predicted CPU usage ratio of the host A which accompanies the addition of the business process D is calculated. Assuming that the assumed usage frequency of the business process D inputted from the system administrator at the call-relation analysis step 305 is equal to 4 requests/time, and that the per-instance CPU usage ratio inputted therefrom is equal to 2.5%/request, the increase amount in the CPU usage ratio of the host A becomes equal to 4×2.5=10%/time in the example where the numerical values in FIG. 5 and FIG. 6 are used. Adding this increase amount to the temporary predicted CPU usage ratio 30%/time of the host A (which is shown from the predicted CPU usage ratio 339 on the computer management table 312) results in 40%/time. This value is stored into the predicted CPU usage ratio 339 of the host A on the computer management table 312.

The assumed usage frequency is an evaluation of the number of execution of a business process to be newly added. The assumed usage frequency is the data which should be inputted by the system administrator. Being not limited thereto, however, the system may automatically input the assumed usage frequency based on the number of execution of a business process or the like which performs a similar processing.

After the above-described storage, services which will be called from the business process D are determined from the call relation table 310. In this case, the resultant services determined are the business process B and the service D. Accordingly, the computer-resource usage amount prediction step 306 is executed by defining the analysis target as the business process B and the service D in sequence. When calling the computer-resource usage amount prediction step 306 with the business process B defined as the analysis target, the computer-resource usage amount prediction step 306 is executed employing 4 requests/time as the increase amount in the usage frequency of the business process B. Here, this value of 4 requests/time is obtained by multiplying 4 requests/time, i.e., the assumed usage frequency of the business process D, by 1.0, i.e., the call ratio in the record where the caller on the call relation table 310 is the business process D, and the callee thereon is the business process B.

Similarly, when calling the computer-resource usage amount prediction step 306 with the service D defined as the analysis target, the computer-resource usage amount prediction step 306 is executed employing 2 requests/time as the increase amount in the usage frequency of the service D. Here, this value of 2 requests/time is obtained by multiplying 4 requests/time, i.e., the assumed usage frequency of the business process D, by 0.5, i.e., the call ratio in the record where the caller on the call relation table 310 is the business process D, and the callee thereon is the service D.

In the computer-resource usage amount prediction step 306 with the business process B defined as the analysis target, as is the case with the business process D, the predicted CPU usage ratio of the host B, i.e., the addition-destination computer of the business process B, is calculated. The increase amount in the CPU usage ratio of the host B is equal to 20%/time, which is a value obtained by multiplying 4 requests/time, i.e., the increase amount in the usage frequency, by 5%, i.e., the per-instance CPU usage ratio 332 of the business process B shown from the service management table 311. Accordingly, the predicted CPU usage ratio 339 of the host B becomes equal to 60%/time, i.e., a value obtained by adding 20%/time to the temporary predicted CPU usage ratio 40%/time. Moreover, the call relation table 310 indicates that the business process B will call the service A and the service B. Consequently, the computer-resource usage amount prediction step 306 is executed by defining the analysis target as the service A and the service B in sequence.

As a consequence, the predicted CPU usage ratio of the host C, i.e., the addition-destination computer of the service A, and that of the host D, i.e., the addition-destination computer of the service B, are calculated in basically the same way as before. The resultant predicted CPU usage ratio of the host C and that of the host D become equal to 80%/time and 60%/time, respectively. The call relation table 310 indicates that the service A and the service B will call no other services. Consequently, no further calls for the recursive computer-resource usage amount prediction step 306 are executed, then returning to the computer-resource usage amount prediction step 306 with the business process B defined as the analysis target, Furthermore, when the computer-resource usage amount prediction step 306 with the business process B defined as the analysis target has been terminated, the computer-resource usage amount prediction step 306 with the service D defined as the analysis target is executed. As a result, the predicted CPU usage ratio of the host E, i.e., the addition-destination computer of the service D, becomes equal to 30%/time. As a consequence of the above-described processings, all of the call relations from the business process D are traced. This tracing completes the calculations of the predicted CPU usage ratios.

In this way, based on the computer-resource usage amount prediction step 306 using the call relations and call ratios for the services on the call relation table 310, at the time of adding a new business process, the system administrator has only to input the information associated with the new business process to be added, i.e., the call ratios for the services to be called from the business process, and the assumed usage frequency and per-instance assumed CPU usage ratio of the business process. Thanks to the step 306, this mere input by the system administrator makes it possible to calculate, semi-automatically and for the computers of the entire system, the computer-resource usage amount in the future in the case where the business process is added.

Also, as the computer-resource usage amount, being not limited to the CPU usage ratio, the memory usage amount or disc usage amount may also be calculated based on the computer-resource usage amount prediction step 306 in basically the same way. By presenting to the system administrator the computer-resource usage amount in the future calculated using this computer-resource usage amount prediction step 306, it becomes possible for the system administrator to judge a resource which is likely to run short, and to add the resource in advance by manual operation. Also, by carrying out the policy-based management to the computer-resource usage amount in the future, it becomes possible to automatically perform securing of the resource in accordance with a management policy defined beforehand.

Hereinafter, referring to an example of the PAD diagram in FIG. 11, the explanation will be given below regarding the policy-based management execution step 308, which will be executed after the computer-resource usage amount prediction step 306.

(step 3081) A policy-based management 600 is applied to the predicted CPU usage ratio 339 on the computer management table 312. It is assumed that, however, if the computer resource has been secured in an extension of this policy-based management, and if the addition of a service or a business process is to be newly performed, only an execution request for the addition of the service or the business process is directly made to the management agents 210 without executing the addition-operation execution unit 303.

Figure 17:
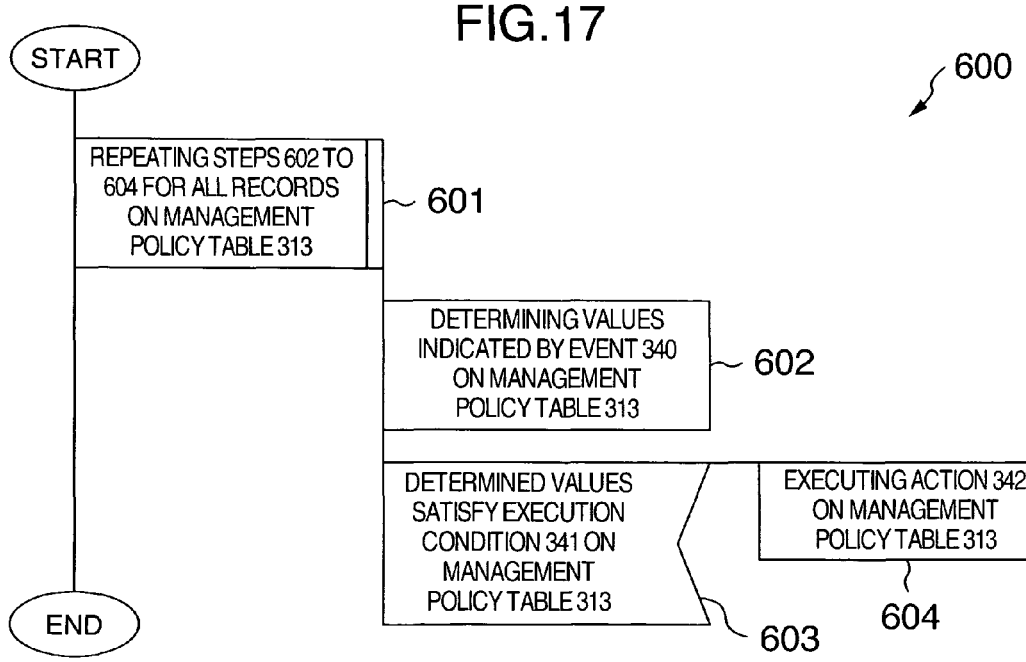
FIG. 17 is an example of the PAD diagram of the policy-based management.

Referring to an example of the PAD diagram in FIG. 17, the explanation will be given below concerning the policy-based management 600 applied to the predicted CPU usage ratio 339 on the computer management table 312.

(step 601) Steps 602 to 604 are repeated for all the records on the management policy table 313. In the present embodiment, it is assumed that, as illustrated in FIG. 4, there exist only the records where the event 340 is "predicted CPU usage ratio of computer", the execution condition 341 is "70% or more", and the action 342 is "addition of computer".

(step 602) The value indicated by the event 340 on the management policy table 313 is determined. In the present embodiment, since the value in the event 340 is "predicted CPU usage ratio of computer", the predicted CPU usage ratio 339 of each computer on the computer management table 312 is determined.

(step 603) It is checked whether or not the value determined at the step 602 satisfies the execution condition 341 on the management policy table 313. If the value satisfies the execution condition 341, the step 604 is executed.

(step 604) The action 342 on the management policy table 313 is executed.

In the present embodiment, it is checked whether or not the predicted CPU usage ratio 339 of each computer on the computer management table 312 satisfies the execution condition 341 of "70% or more". Then, the predicted CPU usage ratio of the service execution computer host C is given as being 80%, which satisfies the execution condition 341 of "70% or more". Accordingly, the action 342 of "addition of computer" is executed to the host C. In the present embodiment, the computer management table 312 indicates that the host F is an idle computer resource. Consequently, the service A, i.e., the service which is the same as the service being in operation on the host C, is added onto the service execution computer host F. In this way, the addition of another computer on which the service which is the same as a service being in operation on a certain computer will be in operation is referred to as "scale out".

In the above-described policy-based management 600, various types of management policies are set in advance on the management policy table 313 illustrated in FIG. 4. This in-advance setting allows executions of not only the above-described scale out, but also the various types of managements.

For example, records of the following management policy are set in advance on the management policy table 313: Namely, the same event 340 (i.e., "predicted CPU usage ratio of computer") and the same execution condition 341 (i.e., "70% or more") as the above-described ones, and the action 342 is "scale up of CPU". This in-advance setting allows implementation of an management that the present CPU of a computer whose predicted CPU usage ratio has exceeded 70% is replaced by another CPU whose performance is higher than that of the present CPU. As a method for implementing the scale up, a service which is being executed at present by a computer is transferred to another computer whose CPU or memory's processing capability is higher than that of the computer. This transfer allows the implementation of the scale up to the higher processing-capability computer, thereby making it possible to execute the service there.

Similarly, the following management policy is set in advance: Namely, the same event 340 and the same execution condition 341 as the above-described ones, and the action 342 is "replacement of high-load service by low-load service". This in-advance setting allows implementation of a management that, of services on a computer whose predicted CPU usage ratio has exceeded 70%, a high-load service is replaced by a low-load service on another computer. Also, similarly, depending on the action 342, it becomes possible to implement a management that a high-load service on a computer satisfying the execution condition is displaced onto an idle computer, or an management that a low-load service on a computer satisfying the execution condition is displaced onto another computer.

Incidentally, "displacement of service onto another computer" is implemented by executing the same service on another computer, and halting or deleting the service which has been in operation on the source computer. At this time, a client or the like which has been using the service to be displaced is informed of an identifier such as an IP address of the displacement-destination computer after take-over of the service. This allows implementation of the take-over of the service. Also, as another method, the IP address of the displacement-destination computer after displacement of the service is changed to an IP address which the source computer before displacement of the service has been using. As a result, when seen from the client's standpoint, the client can enjoy offer of the same service with the same destination IP address.

Also, records of the following management policy are set in advance on the management policy table 313: Namely, the event 340 is "predicted CPU usage ratio of computer", the execution condition 341 is "30% or less", and the action 342 is "displacement of service onto another computer". This in-advance setting allows implementation of a management that a service on a computer whose CPU usage ratio will become lower is displaced onto another computer thereby to create an idle computer resource. Also, the following management policy is set in advance: Namely, the same event 340 and the same execution condition 341, and the action 342 is "deletion of service". This in-advance setting allows implementation of a management that a service on a computer whose predicted CPU usage ratio has become 30% or less is deleted if the same service is in operation on another computer. Also, the following management policy is set in advance: Namely, the same event 340 and the same execution condition 341, and the action 342 is "scale down or scale in". This in-advance setting allows implementation of an management that the number of computers of the same configuration is reduced, or scale down of computer resources is performed.

As another management, the following management becomes implementable: Namely, when wishing to add a new service to a computer A, after a service which has been already in operation on the computer A is displaced onto another computer which satisfies the execution condition, the new service is executed on the computer A whose load will become lower because of the displacement.

Furthermore, at the time of the addition of a computer resource or the addition, displacement, and deletion of a service at the step 604, these operations are also implementable based on characteristics of a service or a business process. For example, depending on a service, a restriction is conceivable that the service must operate on a specific computer from requirements on business-operations such as access restriction, or a restriction is conceivable that co-existence of the service with another service needs to be avoided because availability and reliability of the service become required. In order to perform the addition of a computer resource which takes this kind of requirements into consideration, there is provided a table for storing restrictions for each service. Then, records on this table are set in advance at the time of the addition of the services. Next, the addition of the computer resource is implementable based on the information on the restrictions.

For example, like the present embodiment, when the computer-resource usage amount of the host C satisfies the execution condition set in the management policy, and thus when the computer resource is to be added thereto, if no restrictions are imposed on the service A that is operating on the host C, reference is made to the computer management table 312. Thereby, the host F, i.e., the idle computer resource, is secured, then adding the service A onto the host F. This processing allows the execution of the load distribution. Also, if a restriction that the service A is operable only on the host C is imposed on the service A, there exists no other choice than implementing the scale up of the host C. Accordingly, a countermeasure such as issuing a warning to the system administrator is taken. Also, if no idle computer resource exists in the entire system, and if no restrictions are imposed on the service A, the load distribution is implementable by adding the service A onto another computer whose CPU usage ratio is low. However, if the restriction that the co-existence of the service A with another service is absolutely impossible is imposed thereon, the countermeasure of issuing a warning to the system administrator is taken again.

The above-described policy-based management execution step 308 is carried out before the addition of a business process to the service execution infrastructure program 400. This processing allows execution of the policy-based management where the predicted CPU usage ratio is set as the event, thereby making it possible to secure the computer resource of a computer which satisfies a condition set in advance. In the example in FIG. 3, the host C satisfies the execution condition of "predicted CPU usage ratio is 70% or more" set on the management policy table 313. Accordingly, the service A, i.e., the service which is the same as the service being in operation on the host C, is added onto the host F, i.e., the idle computer resource on which no service is in operation. As a result, it becomes possible to prevent in advance an increase in the load imposed on the service A due to the addition of the business process D. As a consequence, it becomes possible to prevent influences from being exerted on the performance of a business process which will take advantage of the service A indirectly or directly.

As having been described so far, according to the present embodiment, based on the call relation table created on the basis of call relations for services and business processes capable of extracted from a business process definition, computers influenced by addition of the business process are identified, then calculating predicted CPU usage ratios for these computers. Moreover, the policy-based management is applied to the predicted CPU usage ratios in accordance with an management policy that a computer resource will be added to a computer if the predicted CPU usage ratio of the computer has become larger than a predetermined value. Before the business process has been actually added, this processing makes it possible to secure another computer resource for a computer whose resource is likely to run short in the future.

Also, in the first embodiment, as the computer-resource usage amount, attention has been focused on only the CPU usage ratio of a computer. It is also possible, however, that attention be focused on the memory usage amount of the computer or the usage ratio of the storage device. Namely, the prediction values on these values are calculated, then describing a management policy for these prediction values. This processing makes it possible to judge the presence or absence of necessity for the addition of a resource based on the computer-resource usage amounts other than the CPU usage ratio, and to add the resource in advance if required.

Also, further, not only simple "scale out" but also "scale up" and "displacement of service" are set as the action in the management policy for the prediction values. This in-advance setting allows implementation of a management that a reduction in the computer-resource usage amount is performed.

Incidentally, although, in the present embodiment, the service management program 300 and the service execution infrastructure programs 400 are operated on the different computers, they may be operated on one and the same computer. Also, the system configuration in FIG. 1 is an example for indicating the processing steps in the present embodiment. Accordingly, the business processes and the services may also be distributed on one and the same service execution infrastructure program 400.

Next, the explanation will be given below concerning a second embodiment. In the first embodiment, the explanation has been given regarding the case where the management of all the service execution computers configuring the system is performed by the single service management program 300 (i.e., in the case of a single management domain). Considering inter-system combinations such as B to B, however, a case is also conceivable where a plurality of management domains exist and a service existing in another management domain will be called.

In the present embodiment, it will be shown that, in the case where a plurality of management domains exist as illustrated in FIG. 12, it is also possible to make the prediction of a computer-resource usage amount, and to perform the securing of a computer resource based on the prediction value. First, as illustrated in FIG. 12, when a plurality of management domains exist, a configuration is employed where the service management program 300 is set up for each management domain. Also, the processing flow implemented by the provisioning unit 304 is basically the same as the one in the first embodiment. The present embodiment, however, differs from the first embodiment in the following points:

First, there is newly provided a domain combination table 314 for implementing the mutual combination among the service management programs 300 existing in the respective management domains. Moreover, in the computer-resource usage amount prediction step 306 and the policy-based management execution step 308 which are the processings inside the provisioning unit 304, communications are performed among the service management programs 300 by using this domain combination table 314. This configuration allows the present embodiment to be carried out among the plurality of management domains. Hereinafter, the explanation will be given below regarding only these different points.

First, using FIG. 13, the configuration of the domain combination table 314 will be explained. The domain combination table 314 includes a service name 350 and a management server address 351. The service name 350 stores therein the service name of a service or a business process existing in an external management domain. Also, the management server address 351 stores therein the address of a service management program 300 for managing services for each service of the external management domain. This domain combination table 314 may be set in advance by the system administrator 900, or may be automatically set in combination with a network management device or the like.

Figure 14:
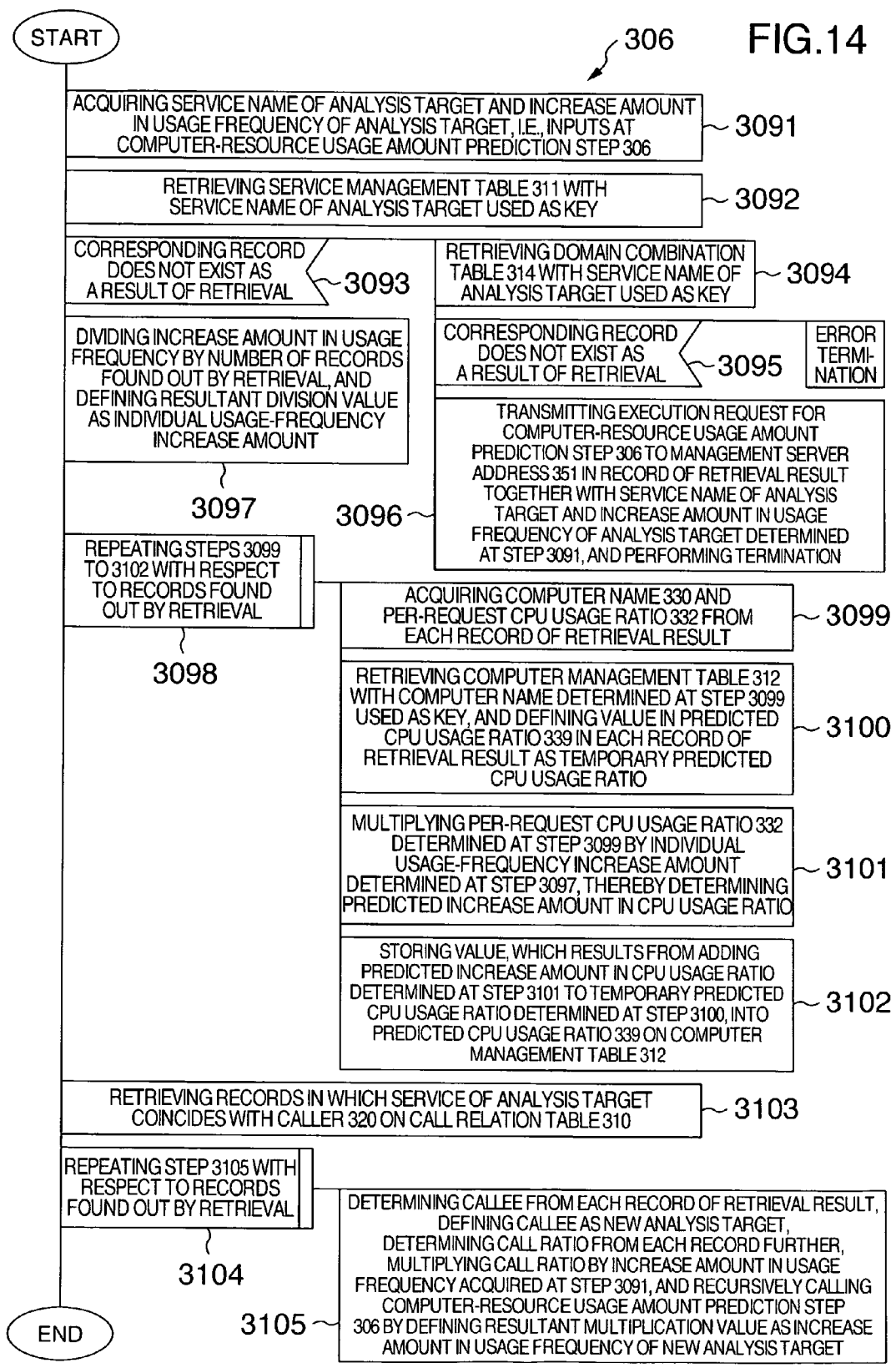
FIG. 14 is an example of the PAD diagram of a computer-resource usage amount prediction step 306 in the second embodiment.

Next, FIG. 14 illustrates an example of the computer-resource usage amount prediction step 306 in the second embodiment.

(step 3091) The service name of an analysis target and an increase amount in the usage frequency of the analysis target, i.e., the inputs at the computer-resource usage amount prediction step 306, are acquired, then executing a step 3092.

(step 3092) Retrieving with the service name of the analysis target used as the key on the service management table 311 is made, then executing a step 3093.

(step 3093) As a result of the retrieval at the step 3092, if the corresponding record does not exist, a step 3094 is executed. Meanwhile, if the corresponding record exists, a step 3097 is executed.

(step 3094) Retrieving with the service name of the analysis target used as the key on the domain combination table 314 is made, then executing a step 3095.

(step 3095) As a result of the retrieval at the step 3094, if the corresponding record does not exist, an error termination is performed. Meanwhile, if the corresponding record exists, a step 3096 is executed.

(step 3096) An execution request for the computer-resource usage amount prediction step 306 is transmitted to the management server address 351 in the record of the retrieval result by employing, as arguments, the service name of the analysis target and the increase amount in the usage frequency of the analysis target determined at the step 3091. Moreover, the address of the transmission destination is stored onto the main storage device or secondary storage device as the combination-destination address, then performing the termination. The combination-destination address is used at the policy-based management execution step 308 which will be executed after the computer-resource usage amount prediction step 306. Having received this execution request for the computer-resource usage amount prediction step 306, the service management program 300 executes the computer-resource usage amount prediction step 306 by employing the received arguments as arguments of the computer-resource usage amount prediction step 306 of its own with no change made to the received arguments.

(step 3097) The increase amount in the usage frequency determined at the step 3091 is divided by the number of records found out by the retrieval at the step 3092, and the resultant division value is defined as an individual usage-frequency increase amount, then executing a step 3098.

(step 3098) Steps 3099 to 3102 are repeated with respect to the records found out by the retrieval at the step 3092. When the repetition has been terminated, a step 3103 is executed.

(step 3099) The computer name 330 and the per-instance CPU usage ratio 332 are acquired from each record of the retrieval result at the step 3092, then executing a step 3100.

(step 3100) Retrieving with the computer name determined at the step 3099 used as the key on the computer management table 312 is made, then defining the predicted CPU usage ratio 339 in each record of the retrieval result as a temporary predicted CPU usage ratio. After that, a step 3101 is executed.

(step 3101) The per-instance CPU usage ratio 332 determined at the step 3099 is multiplied by the individual usage-frequency increase amount determined at the step 3097, thereby determining a predicted increase amount in the CPU usage ratio, and then executing a step 3102.

(step 3102) A value resulting from adding the predicted increase amount in the CPU usage ratio determined at the step 3101 to the temporary predicted CPU usage ratio determined at the step 3100 is stored into the predicted CPU usage ratio 339 on the computer management table 312.

(step 3103) Records in which the service of the analysis target coincides with the caller 320 are retrieved on the call relation table 310, then executing a step 3104.

(step 3104) A step 3105 is repeated with respect to the records found out by the retrieval at the step 3103. When the repetition has been terminated, the computer-resource usage amount prediction step 306 is terminated.

(step 3105) The callee 321 is determined from each record of the retrieval result at the step 3103, then defining this callee 321 as a new analysis target. Moreover, the call ratio 322 is determined from each record of the retrieval result, then being multiplied by the increase amount in the usage frequency acquired at the step 3091. Furthermore, the computer-resource usage amount prediction step 306 is recursively called by defining the resultant multiplication value as an increase amount in the usage frequency of the new analysis target.

In the above-described computer-resource usage amount prediction step 306, if the service of the analysis target does not exist in the domain, i.e., if the service is not found out as a result of retrieving the service management table 311 with the service name used as the key, the domain combination table 314 is retrieved with the service name used as the key. Moreover, the execution request for the computer-resource usage amount prediction step 306 is transmitted to the management server address 351 obtained as a result of retrieving the domain combination table 314. This processing transfers and commissions the execution of the computer-resource usage amount prediction step 306 to the service management program 300 existing in another management domain. This configuration allows the present embodiment to be carried out among the plurality of management domains.

Finally, FIG. 15 illustrates an example of the policy-based management execution step 308 in the second embodiment.

(step 3130) The policy-based management 600 is applied to the predicted CPU usage ratio 339 on the computer management table 312.

(step 3131) An execution request for the policy-based management execution step 308 is transmitted to the combination-destination address stored at the step 3096 at the computer-resource usage amount prediction step 306. Having received this execution request for the policy-based management execution step 308, the service management program 300 executes the policy-based management execution step 308 of its own.

Based on the policy-based management execution step 308 explained so far, the execution request for the policy-based management execution step 308 is transmitted to the service management program 300 with which the source service management program 300 had established the combination at the time of having executed the computer-resource usage amount prediction step 306. This processing transfers and commissions the execution of the policy-based management execution step 308 as well to another management domain. This configuration allows the present embodiment to be carried out among the plurality of management domains.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A management method executed by a management computer, for managing a business process execution system for executing a plurality of business processes and services, said management method comprising:
   storing a call relation table in a storage of said management computer, said call relation table comprising call relations between a caller business process and at least one of callee business process and callee service;
   receiving a business process defined by a business process execution language and inputted by a system administrator through said management computer;
   specifying, for an additional caller business process to be added to said call relation table, at least one of callee business process and callee service, in response to said business process defined by a business process execution language and inputted through said management computer by said system administrator;
   calculating an evaluation of a number of executions of said at least one of callee business process and callee service of said additional caller business process to be added to said call relation table;
   determining a prediction value of a Central Processing Unit (CPU) usage of said management computer by acquiring an evaluation of a number of said at least one of callee business process and callee services of said calculated number in said call relation table;
   wherein said additional caller business process to be added to said call relation table is configured by said at least one of callee business process and callee service, and said at least one of callee business process and callee service being executed when an execution request for said additional caller business process to be added to said call relation table is executed; and
   judging whether or not said prediction value of said CPU usage of said computer satisfies a predetermined condition in order to obtain a judgment result, and determining whether or not said business process to be added should be added to said business-process execution system in accordance with said judgment result.

2. The management method according to claim 1, said management method further comprising:
   storing call ratios in said call relation table, said call ratios being specified as an assumed usage frequency of said at least one of callee business process and callee services when said caller business process is executed; and
   calculating, by using said call ratios stored in said call relation table, said number of executions of said at least one of callee business process and callee services of said caller business process.

3. The management method according to claim 2, further comprising:
   creating said call relation table based on said call relation in which said caller business process calls said at least one of callee business process and callee service, said call relation being described in a business process definition of said business process.

4. The management method according to claim 1, wherein: said prediction value of said CPU usage of said computer is determined from said execution number-of-times, and value of said CPU usage of said computer per service execution.

5. The management method according to claim 1, wherein: said CPU usage of said computer is a CPU usage of at least one of: a CPU, a main storage device, and a secondary storage device of said computer.

6. The management method according to claim 1, further comprising:
   if it is determined that said additional caller business process to be added should be added,
   allocating another computer for executing said at least one of callee business process and callee service configuring said additional caller business process to be added, said another computer being different from said computer on which it is judged whether or not said prediction value of said CPU usage satisfies said predetermined condition.

7. The management method according to claim 1, further comprising:
- if it is determined that said additional caller business process to be added should be added,
- displacing said at least one of callee business process and callee service to another computer, said at least one callee business process and callee service being executed on said computer on which it is judged whether or not said prediction value of said CPU usage satisfies said predetermined condition; and
- executing said at least one of callee business process and callee service on said computer satisfying said predetermined condition, said at least one of callee business process and callee service configuring said additional caller business process to be added.

8. The management method according to claim 1, further comprising:
- if it is determined that said additional caller business process to be added should be added,
- carrying out at least one of scale out, scale up, scale in, and scale down to said computer on which it is judged whether or not said prediction value of said CPU usage satisfies said predetermined condition.

9. The management method according to claim 1, further comprising:
- if it is determined that said additional caller business process to be added should be added, carrying out at least one of: deletion of said at least one of callee business process and callee service, duplication of said at least one of callee business process and callee service onto another computer, displacement of said at least one of callee business process and callee service onto another computer, and replacement of said at least one of callee business process and callee service by at least one of callee business process and callee service being executed on another computer.

10. A business-process execution system including a management computer, for executing a business process which is a combination of services, said execution system comprising:
- a call relation table stored in a storage of said management computer, that comprises call relations between a caller business process and at least one of callee business process and callee service;
- said management computer receives a business process defined by a business process execution language and inputted by a system administrator;
- a specifying unit, executed by a processor, that specifies an additional caller business process to be added to said call relation table, at least one of callee business process and callee service, in response to said business process defined by a business process execution language and inputted through said management computer by said system administrator;
- a calculating unit, executed by a processor, that calculates an evaluation of a number of executions of said at least one of callee business process and callee service of said additional caller business process to be added to said call relation table;
- a provisioning unit, executed by a processor, for determining a prediction value of a Central Processing Unit (CPU) usage of said management computer by acquiring an evaluation of a number of said at least one of callee business process and callee services of said calculated number in said call relation table, said at least one of callee business process and callee service configuring said caller business process to be added to said business-process execution system, and said at least one of callee business process and callee service being executed when an execution request for said additional caller business process to be added is executed; and
- a policy-based management unit, executed by a processor, for judging whether or not said prediction value of said CPU usage of said computer satisfies a predetermined condition in order to obtain a judgment result, and determining whether or not said business process to be added should be added to said business-process execution system in accordance with said judgment result.

11. The business-process execution system according to claim 10, wherein:
- said call relation table stores call ratios, wherein said call ratios are specified as an assumed usage frequency of said at least one of callee business process and callee services when said caller business process is executed; and
- said provisioning unit determining said number of execution of said at least one of callee business process and callee service from an assumed usage frequency in a case where said additional caller business process to be added is executed, and from said call ratios for said at least one of callee business process and callee service extracted from said call relation table.

12. The business-process execution system according to claim 11, wherein:
- said call relation table is created based on said call relation in which said caller business process calls said at least one of callee business process and callee service, and said call relation is described in a business process definition of said caller business process.

13. The business-process execution system according to claim 10, wherein:
- said provisioning unit determines said prediction value of said CPU usage of said management computer from said number of executions, and a value of said CPU usage of said computer per service execution.

14. The business-process execution system according to claim 10, wherein:
- said CPU usage of said management computer is a CPU usage of at least one of a CPU, a main storage device, and a secondary storage device of said computer;
- said execution system further comprising an agent management unit, executed by a processor, for monitoring said CPU usage of at least one of said CPU, said main storage device, and said secondary storage device.

15. The business-process execution system according to claim 10, further comprising:
- wherein, if it is determined that said additional caller business process to be added should be added,
- said policy-based management unit allocates another computer for executing said at least one of callee business process and callee service configuring said additional caller business process to be added, said another computer being different from said management computer on which it is judged whether or not said prediction value of said CPU usage satisfies said predetermined condition.

16. The business-process execution system according to claim 10, further comprising:
- wherein, if it is determined that said additional caller business process to be added should be added,
- said policy-based management unit displaces said at least one of callee business process and callee service to another computer, said at least one of callee business process and callee service being executed on said another computer on which it is judged whether or not said prediction value of said CPU usage satisfies said predetermined condition, and executes said at least one of callee business process and callee service on said another computer satisfying said predetermined condition, said at least one of callee business process and callee service configuring said additional caller business process to be added.

17. The business-process execution system according to claim 10, further comprising:
wherein, if it is determined that said additional caller business process to be added should be added,
said policy-based management unit carries out at least one of scale out, scale up, scale in, and scale down to said management computer on which it is judged whether or not said prediction value of said CPU usage lead satisfies said predetermined condition.

18. The management method according to claim 1, wherein said at least one of callee business process and callee service of said additional caller business process to be added is repeatedly referred to after being added to said call relation table in said storage.

19. The business-process execution system according to claim 10, wherein said at least one of callee business process and callee service of said additional caller business process to be added is repeatedly referred to after being added to said call relation table in said storage.

* * * * *